United States Patent [19]
Negoro et al.

[11] Patent Number: 6,156,459
[45] Date of Patent: Dec. 5, 2000

[54] NONAQUEOUS-ELECTROLYTIC SOLUTION SECONDARY BATTERY

[75] Inventors: Masayuki Negoro; Jiro Tsukahara, both of Minami-ashigara, Japan

[73] Assignee: Fuji Photo Film Co., Ltd., Kanagawa-ken, Japan

[21] Appl. No.: 09/061,144

[22] Filed: Apr. 16, 1998

[30] Foreign Application Priority Data

Apr. 17, 1997 [JP] Japan ..................................... 9-100683

[51] Int. Cl.$^7$ ...................................................... H01M 6/18
[52] U.S. Cl. ........................... 429/322; 429/324; 429/326; 429/231.95; 429/231.8
[58] Field of Search ........................... 429/231.95, 231.8, 429/322, 324, 326, 338, 342

[56] References Cited

U.S. PATENT DOCUMENTS 5,891,592   4/1999   Mao et al. ............................... 429/197

FOREIGN PATENT DOCUMENTS 0785586   7/1997   European Pat. Off. ......... H01M 4/48

*Primary Examiner*—Maria Nuzzolillo
*Assistant Examiner*—Angela J. Martin
*Attorney, Agent, or Firm*—Sughrue, Mion, Zinn, Macpeak & Seas, PLLC

[57] ABSTRACT

There is disclosed a nonaqueous-electrolytic solution secondary battery that comprises a negative-electrode material, a positive-electrode material, and a nonaqueous electrolytic solution containing a lithium salt, wherein the battery contains an organoboron compound. This nonaqueous-electrolytic solution secondary battery has high capacity and good charge and discharge cycle characteristics.

11 Claims, 1 Drawing Sheet

NONAQUEOUS-ELECTROLYTIC SOLUTION SECONDARY BATTERY

FIELD OF THE INVENTION

The present invention relates to a high-capacity non-aqueous-electrolytic-solution secondary battery excellent in charge and discharge cycle characteristics. Further, the present invention relates to an improvement in charge and discharge characteristics, such as charge and discharge cycle life, of a non-aqueous-electrolytic-solution secondary battery having a large discharge capacity and comprising a negative electrode mainly made of an amorphous chalcogen compound and/or an amorphous oxide.

BACKGROUND OF THE INVENTION

Recently, development of portable electronic machinery and tools has been accelerated by practical use of a lithium secondary battery that provides high voltage and high capacity, and as a result demand for the lithium secondary battery has been increasing. The lithium secondary battery that provides high voltage and high capacity has been materialized by using a material that is capable of introducing and releasing lithium, for the negative electrode, and using a complex oxide comprising lithium and a transition metal, for the positive electrode. However, improvement has still been desired in the technical point of charge/discharge cycle life.

Hitherto, attempts to improve cycle characteristics have been made in various fields, in particular regarding the solvent composition of the electrolytic solution and kinds of a supporting electrolyte, because an electrolytic solution-related reaction is involved during a charge/discharge cycle.

Further, an attempt to prevent an electrolytic solution from decomposition by containing a small amount of additives in an electrolytic solution, whereby the cycle life is prolonged, has been made. For example, JP-A-59-3874 (the term "JP-A" as used herein means an "unexamined published Japanese patent application"), JP-A-63-269461, and JP-A-8-321313 describe that boric acid esters, such as trimethyl borate, are added to an electrolytic solution. Further, JP-A-3-236169 describes that silylated boric acid esters are added to an electrolytic solution.

However, the above-mentioned techniques have not yet reached the level that a high discharge capacity is compatible with excellent cycle characteristics.

SUMMARY OF THE INVENTION

An object of the present invention is to provide a non-aqueous electrolytic solution secondary battery that exhibits large discharge capacity and excellent charge/discharge cycle characteristics.

Other and further objects, features, and advantages of the invention will appear more fully from the following description, taken in connection with the accompanying drawing.

DETAILED DESCRIPTION OF THE INVENTION

Figure 1:
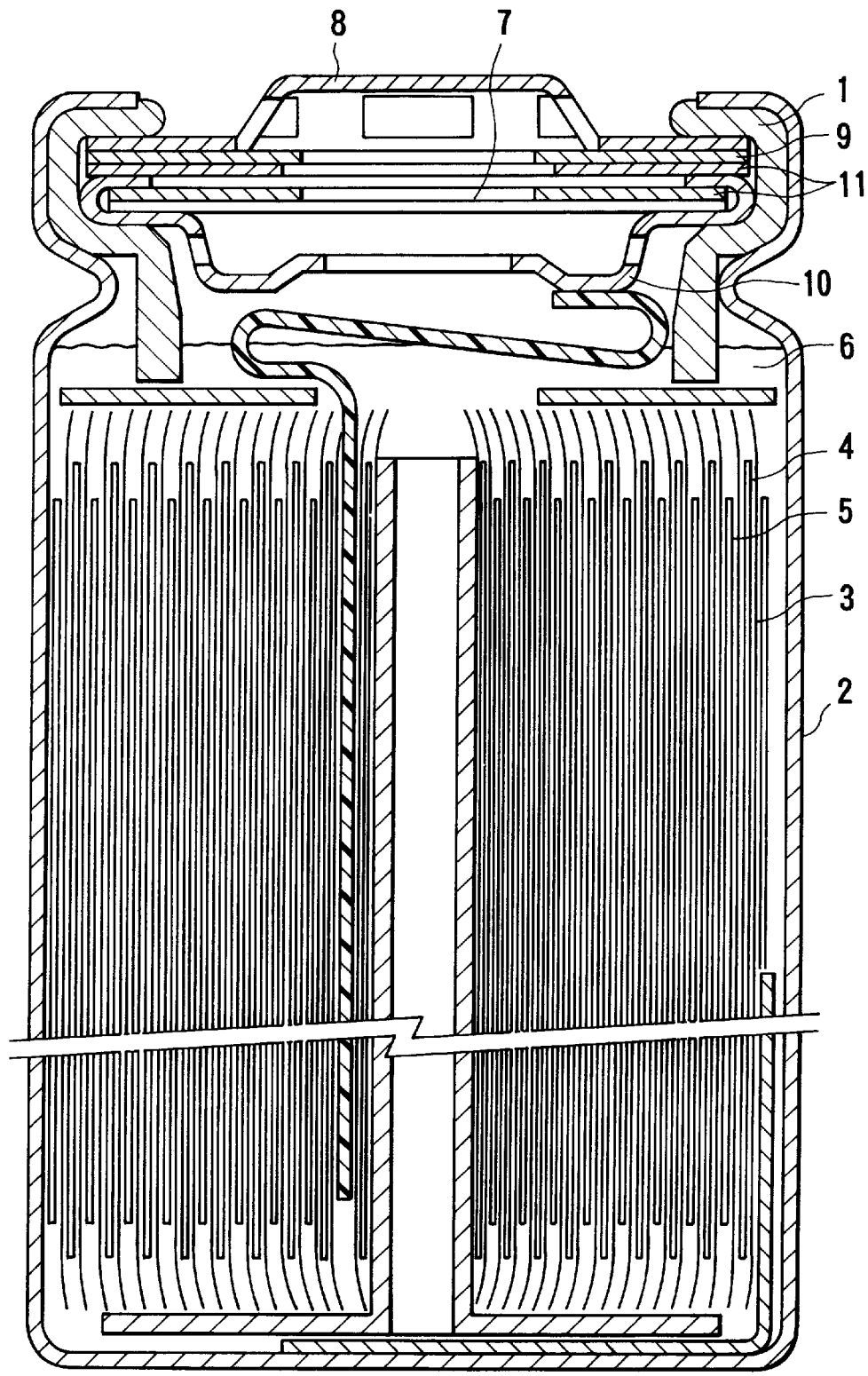
FIG. 1 is a cross-sectional view of a cylinder-type battery that was used in examples.

The above object of the present invention has been attained by a nonaqueous electrolytic solution secondary battery that comprises a positive electrode and a negative electrode, each of which may contain a material capable of reversibly occluding (absorbing) and releasing lithium, a nonaqueous electrolytic solution containing a lithium salt, and a separator, and that further comprises at least one organoboron compound.

Preferable modes of the present invention are given below, but the present invention is not limited to them.

(1) A nonaqueous-electrolytic solution secondary battery, comprising a positive electrode and a negative electrode, which contain a material capable of reversibly occluding and releasing lithium, a non-aqueous electrolytic solution containing a lithium salt, and a separator, wherein the said battery contains at least one organoboron compound.

(2) The nonaqueous-electrolytic solution secondary battery as described in the above (1), wherein the said organoboron compound is a compound represented by the following formula (1):

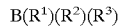

Formula (1)

wherein $R^1$, $R^2$, and $R^3$, which are the same or different from each other, each represent a hydrogen atom, an alkyl group, a cycloalkyl group, an alkoxy group, an alkenyl group, an alkynyl group, an aralkyl group, an aryl group, a halogen atom, a cyano group, a hydroxyl group, a formyl group, an aryloxy group, an alkylthio group, an arylthio group, an acyloxy group, a sulfonyloxy group, an amino group, an alkylamino group, an arylamino group, a carbonamido group, a sulfonamido group, an oxycarbonylamino group, an oxysulfonylamino group, a ureido group, an acyl group, an oxycarbonyl group, a carbamoyl group, a sulfonyl group, a sulfinyl group, an oxysulfonyl group, or a sulfamoyl group, a carboxylic acid group, a sulfonic acid group, a phosphonic acid group, a heterocyclic group, $-B(R^{11})(R^{12})$, $-OB(R^{11})(R^{12})$, $OSi(R^{11})(R^{12})(R^{13})$, or $OSn(R^{11})(R^{12})(R^{13})$; in which $R^{11}$, $R^{12}$, and $R^{13}$, which are the same or different from each other, each represent a hydrogen atom, an alkyl group, a cycloalkyl group, an alkoxy group, an alkenyl group, an alkynyl group, an aralkyl group, an aryl group, a halogen atom, a cyano group, a nitoro group, a hydroxyl group, a formyl group, an aryloxy group, an alkylthio group, an arylthio group, an acyloxy group, a sulfonyloxy group, an amino group, an alkylamino group, an arylamino group, a carbonamido group, a sulfonamido group, an oxycarbonylamino group, an oxysulfonylamino group, a ureido group, an acyl group, an oxycarbonyl group, a carbamoyl group, a sulfonyl group, a sulfinyl group, an oxysulfonyl group, or a sulfamoyl group, a carboxylic acid group, a sulfonic acid group, a phosphonic acid group, or a heterocyclic group; or $R^1$, $R^2$, $R^3$, $R^{11}$, $R^{12}$, and $R^{13}$ may bond together to form a ring, which ring may have a substituent; further, each of the above groups may be substituted by a group capable of substituting thereon.

(3) The nonaqueous-electrolytic solution secondary battery as described in the above (1), wherein the said organoboron compound is a compound represented by the following formula (2):

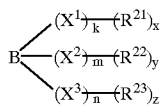

Formula (2)

wherein $X^1$, $X^2$, and $X^3$, which are the same or different from each other, each represent a hetero atom, with the proviso that the hetero atom excludes an oxygen atom; $R^{21}$, $R^{22}$, and $R^{23}$, which are the same or different, each represent a hydrogen atom, an alkyl group, a cycloalkyl group, an alkoxy group, an alkenyl group, an alkynyl group, an aralkyl group, an aryl group, a halogen atom, a cyano group, a hydroxyl group, a formyl group, an aryloxy group, an alkylthio group, an arylthio group, an acyloxy group, a sulfonyloxy group, an amino group, an alkylamino group, an arylamino group, a carbonamido group, a sulfonamido group, an oxycarbonylamino group, an oxysulfonylamino group, a ureido group, an acyl group, an oxycarbonyl group, a carbamoyl group, a sulfonyl group, a sulfinyl group, an oxysulfonyl group, or a sulfamoyl group, a carboxylic acid group, a sulfonic acid group, a phosphonic acid group, or a heterocyclic group, or $R^{21}$, $R^{22}$, and $R^{23}$ may bond together to form a ring, which ring may have a substituent; further, each of the above groups may be substituted by a group capable of substituting thereon; x, y, and z each represent an integer of 1 to 5; when x, y, and z are 2 or more, the plural $R^{21}$'s, $R^{22}$'s, and $R^{23}$'s each are the same or different; and k, m, and n each represent 0 (zero) or an integer, with the proviso that at least one of k, m, and n is 1 or more.

(4) The nonaqueous-electrolyte secondary battery as described in the above (1), wherein the said organoboron compound is a compound represented by the following formula (3):

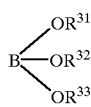

Formula (3)

wherein $R^{31}$, $R^{32}$, and $R^{33}$ each represent an alkyl group or an aryl group.

(5) The nonaqueous-electrolyte secondary battery as described in the above (1), wherein the said organoboron compound is a compound represented by the following formula (4):

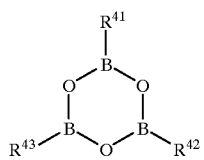

Formula (4)

wherein $R^{41}$, $R^{42}$, and $R^{43}$ each represent an alkyl group or an alkoxy group.

(6) The nonaqueous-electrolyte secondary battery as described in the above (1), wherein the said organoboron compound is a compound represented by the following formula (5):

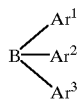

Formula (5)

wherein $Ar^1$, $Ar^2$, and $Ar^3$ each represent an aryl group.

(7) The nonaqueous-electrolytic solution secondary battery as described in any one of the above (1) to (6), wherein the said organoboron compound is contained in a nonaqueous electrolytic solution containing a lithium salt.

(8) The nonaqueous-electrolytic solution secondary battery as described in the above (7), wherein the content of the said at least one organoboron compound contained in the said nonaqueous-electrolytic solution is 0.001 to 10% by weight, to the supporting electrolyte contained in the said electrolytic solution.

(9) The nonaqueous-electrolytic solution secondary battery as stated in the above (8), wherein the said supporting electrolyte at least comprises $LiBF_4$ and/or $LiPF_6$.

(10) The nonaqueous-electrolyte secondary battery as described in any one of the above (1) to (9), wherein a solvent of the nonaqueous electrolytic solution comprises at least one cyclic carbonic acid ester, and at least one chain carbonic acid ester.

(11) The nonaqueous-electrolytic solution secondary battery as described in any one of the above (1) to (10), wherein the said negative electrode comprises a carbonaceous material capable of occluding and releasing lithium.

(12) The nonaqueous-electrolytic solution secondary battery as described in any one of the above (1) to (10), wherein the said negative electrode comprises an negative-electrode material mainly comprising an amorphous chalcogen compound and/or an amorphous oxide, each of which contains not less than three kinds of atoms selected from the 1, 2, 13, 14, and 15 group atoms of the periodic table.

(13) The nonaqueous-electrolytic solution secondary battery as described in the above (12), wherein at least one of the said negative-electrode materials is represented by formula (6):

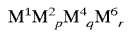

Formula (6)

wherein $M^1$ and $M^2$, which are different from each other, each represent at least one selected from Si, Ge, Sn, Pb, P, B, Al, and Sb; $M^4$ represents at least one selected from Li, Na, K, Rb, Cs, Mg, Ca, Sr, and Ba; $M^6$ represents at least one selected from O, S, and Te; p and q each represent a number of 0.001 to 10, and r represents a number of 1.00 to 50.

Examples of the organoboron compounds for use in the present invention include compounds as described in, for example, H. Steinberg, "Organoboron Chemistry, Vol. 1 to 3, Wiley & Sons Inc., New York (1964)."

The compounds represented by formula (1) are described in detail below.

In formula (1), $R^1$, $R^2$, and $R^3$, which are the same or different from each other, each represent a hydrogen atom, an alkyl group (preferably having 1 to 16 carbon atoms, e.g. methyl, ethyl, propyl, dodecyl), a cycloalkyl group (preferably having 3 to 9 carbon atoms, e.g. cyclopropyl, cyclohexyl), an alkoxy group (preferably having 1 to 16 carbon atoms, e.g. methoxy, ethoxy, 2-methoxyethoxy), an alkenyl group (preferably having 2 to 16 carbon atoms, e.g.

vinyl, allyl, cyclohexenyl), an alkynyl group (preferably having 2 to 16 carbon atoms, e.g. ethynyl, 2-propenyl, hexadecynyl), an aralkyl group (preferably having 7 to 16 carton atoms, e.g. benzyl, diphenylmethyl, naphthylmethyl), an aryl group (preferably having 6 to 16 carbon atoms, e.g. phenyl, naphthyl, anthryl), a halogen atom (e.g. chlorine, bromine, fluorine), a cyano group, a nitro group, a hydroxyl group, a formyl group, an aryloxy group (preferably having 6 to 16 carbon atoms, e.g. phenoxy), an alkylthio group (preferably having 1 to 16 carbon atoms, e.g. methylthio, -octylthio-2-phenoxyoctylthio), an arylthio group (preferably having 6 to 16 carbon atoms, e.g. phenylthio), an acyloxy group (preferably having 1 to 12 carbon atoms, e.g. acetoxy), a sulfonyloxy group (preferably having 1 to 12 carbon atoms, e.g. methanesulfonyloxy, benzenesulfonyloxy), an amino group, an alkylamino group (preferably having 1 to 32 carbon atoms, e.g. methylamino, butylamino), an arylamino group (preferably having 6 to 32 carbon atoms, e.g. phenylamino), a carbonamido group (e.g. acetylamino, propanoylamino), a sulfonamido group (e.g. methanesulfonamido, benzenesulfonamido), an oxycarbonylamino group (e.g. methoxycarbonylamino), an oxysulfonylamino group (e.g. ethoxysulfonylamino), a ureido group (e.g. phenylureido, methylureido), an acyl group (preferably having 1 to 12 carbon atoms, e.g. acetyl, benzoyl, pivaloyl), an oxycarbonyl group (e.g. methoxycarbonyl), a carbamoyl group (e.g. N-ethylcarbamoyl, N-benzylcarbamoyl), a sulfonyl group (e.g. methanesulfonyl, benzenesulfonyl), a sulfinyl group (e.g. methanesulfinyl), an oxysulfonyl group (e.g. methoxysulfonyl), or a sulfamoyl group (e.g. N-ethylsulfamoyl), a carboxylic acid group or a salt thereof, a sulfonic acid group or a salt thereof, a phosphonic acid group or a salt thereof, a heterocyclic group (preferably a 5- or 6-membered one), $-B(R^{11})(R^{12})$, $-OB(R^{11})(R^{12})$, $-OSi(R^{11})(R^{12})(R^{13})$, or $-OSn(R^{11})(R^{12})(R^{13})$, wherein $R^{11}$, $R^{12}$, and $R^{13}$, which are the same or different from each other, each represent a hydrogen atom, an alkyl group (preferably having 1 to 16 carbon atoms), a cycloalkyl group (preferably having 3 to 9 carbon atoms), an alkoxy group (preferably having 1 to 16 carbon atoms), an alkenyl group (preferably having 2 to 16 carbon atoms), an alkynyl group (preferably having 7 to 16 carbon atoms), an aralkyl group (preferably having 6 to 16 carbon atoms), an aryl group (preferably having 6 to 16 carbon atoms), a halogen atom, a cyano group, a nitro group, a hydroxyl group, a formyl group, an aryloxy group (preferably having 6 to 16 carbon atoms), an alkylthio group (preferably having 1 to 16 carbon atoms), an arylthio group (preferably having 6 to 16 carbon atoms), an acyloxy group (preferably having 1 to 12 carbon atoms), a sulfonyloxy group (preferably having 1 to 12 carbon atoms), an amino group, an alkylamino group (preferably having 1 to 32 carbon atoms), an arylamino group (preferably having 6 to 32 carbon atoms), a carbonamido group, a sulfonamido group, an oxycarbonylamino group, an oxysulfonylamino group, a ureido group, an acyl group (preferably having 1 to 12 carbon atoms), an oxycarbonyl group, a carbamoyl group, a sulfonyl group, a sulfinyl group, an oxysulfonyl group, a sulfamoyl group, a carboxylic acid group, a sulfonic acid group, a phosphonic acid group, or a heterocyclic group (preferably a 5- or 6-membered one). Further, $R^1$, $R^2$, $R^3$, $R^{11}$, $R^{12}$, and $R^{13}$ may bond with each other to form a ring, which ring may have a substituent. Further, each of the groups described in this specification may be substituted by a substituent, if the group can be substituted, unless otherwise specified.

Further, more preferably $R^1$, $R^2$, and $R^3$, which are the same or different, each represent an alkyl group, a cycloalkyl group, an aralkyl group, an aryl group, an alkylthio group, an arylthio group, an alkylamino group, an arylamino group, an aryloxy group, or an alkoxy group, with an aryl group, an arylthio group, an arylamino group, an aryloxy group, and an alkoxy group being particularly preferable.

The compounds represented by formula (2) are described in detail below.

In formula (2), $X^1$, $X^2$, and $X^3$, which are the same or different from each other, each represent a hetero atom, with the proviso that the hetero atom excludes an oxygene atom. $R^{21}$, $R^{22}$, and $R^{23}$, which are the same or different, each represent a hydrogen atom, an alkyl group (preferably having 1 to 16 carbon atoms, e.g., methyl, ethyl, propyl, dodecyl), a cycloalkyl group (preferably having 3 to 9 carbon atoms, e.g., cyclopropyl, cyclohexyl), an alkoxy group (preferably having 1 to 16 carbon atoms, e.g., methoxy, ethoxy, 2-methoxyethoxy), an alkenyl group (preferably having 2 to 16 carbon atoms, e.g., vinyl, allyl, cyclohexenyl), an alkynyl group (preferably having 2 to 16 carbon atoms, e.g., ethynyl, 2-propenyl, hexadecynyl), an aralkyl group (preferably having 7 to 16 carbon atoms, e.g., benzyl, diphenylmethyl, naphthylmethyl), an aryl group (preferably having 6 to 16 carbon atoms, e.g., phenyl, naphthyl, anthryl), a halogen atom (e.g., chlorine, bromine, fluorine), a cyano group, a nitro group, a hydroxyl group, a formyl group, an aryloxy group (preferably having 6 to 16 carbon atoms, e.g., phenoxy), an alkylthio group (preferably having 1 to 16 carbon atoms, e.g., methylthio, octylthio-2-phenoxyoctylthio), an arylthio group (preferably having 6 to 16 carbon atoms, e.g., phenylthio), an acyloxy group (preferably having 1 to 12 carbon atoms, e.g., acetoxy), a sulfonyloxy group (preferably having 1 to 12 carbon atoms, e.g., methanesulfonyloxy, benzenesulfonyloxy), an amino group, an alkylamino group (preferably having 1 to 32 carbon atoms, e.g., methylamino, butylamino), an arylamino group (preferably having 6 to 32 carbon atoms, e.g., phenylamino), a carbonamido group (e.g., acetylamino, propanoylamino), a sulfonamido group (e.g., methanesulfonamido, benzenesulfonamido), an oxycarbonylamino group (e.g., methoxycarbonylamino), an oxysulfonylamino group (e.g., ethoxysulfonylamino), a ureido group (e.g., phenylureido, methylureido), an acyl group (preferably having 1 to 12 carbon atoms, e.g., acetyl, benzoyl, pivaloyl), an oxycarbonyl group (e.g., methoxycarbonyl), a carbamoyl group (e.g., N-ethylcarbamoyl, N-benzylcarbamoyl), a sulfonyl group (e.g., methanesulfonyl, benzenesulfonyl), a sulfinyl group (e.g., methanesulfinyl), an oxysulfonyl group (e.g., methoxysulfonyl), or a sulfamoyl group (e.g., N-ethylsulfamoyl), a carboxylic acid group or a salt thereof, a sufonic acid group or a salt thereof, a phosphonic acid group or a salt thereof, or a heterocyclic group (preferably a 5- or 6-membered one). Further, $R^{21}$, $R^{22}$, and $R^{23}$, may bond with each other to form a ring, which ring may have a substituent. Further, each of the above groups may be substituted by a group capable of substituting thereon. x, y, and z each represent an integer of 1 to 5. When x, y, and z are 2 or more, the plural of $R^{21}$, $R^{22}$, and $R^{23}$ each are the same or different. k, m, and n each represent 0 (zero) or an integer, with the proviso that at least one of k, m, and n is 1 or more.

Further, more preferably $X^1$, $X^2$, and $X^3$, which are the same or different from each other, each represent sulfur, nitrogen, phosphorus, silicon, tin, or boron, with sulfur, nitrogen, phosphorus, and boron being particularly preferable. Preferably $R^{21}$, $R^{22}$, and $R^{23}$, which are the same or different, each represent an alkyl group or an aryl group.

Most preferably $X^1$, $X^2$, and $X^3$ each represent sulfur, nitrogen, phosphorus, or boron, and in addition, $R^{21}$, $R^{22}$, and $R^{23}$ each represent an alkyl group or an aryl group.

The compounds represented by formula (3) are described in more detail.

In formula (3), $R^{31}$, $R^{32}$, and $R^{33}$ each represent an alkyl group (preferably having 1 to 16 carbon atoms, e.g. methyl, ethyl, butyl, dodecyl, cyclohexyl, trifluoromethyl), or a substituted or unsubstituted aryl group (preferably having 6 to 16 carbon atoms, e.g. phenyl, naphthyl, anthryl). A substituted or unsubstituted phenyl group is preferred of these groups. Examples of a substituent include an alkyl group (e.g. methyl, ethyl, butyl, dodecyl, cyclohexyl, trifluoromethyl), an aryl group (e.g. phenyl, naphthyl, anthryl), an alkoxy group (e.g. methoxy, ethoxy, dodecyloxy, benzyloxy, phenoxy), a halogen atom (e.g. chlorine, bromine, fluorine), a cyano group, and a nitro group.

The compounds represented by formula (4) are described in more detail.

In formula (4), $R^{41}$, $R^{42}$ and $R^{43}$ each represent an alkyl group (preferably having 1 to 16 carbon atoms, e.g., methyl, ethyl, butyl, dodecyl, cyclohexyl, trifluoromethyl), or an alkoxy group [preferably having 1 to 16 carbon atoms, e.g., methoxy, ethoxy, dodecyloxy, benzyloxy, a substituted or unsubstituted phenoxy. Examples of a substituent include an alkyl group (e.g., methyl, ethyl, butyl, dodecyl, cyclohexyl, trifluoromethyl), an aryl group (e.g., phenyl, naphthyl, anthryl), an alkoxy group (e.g., methoxy, ethoxy, dodecyloxy, benzyloxy, phenoxy), a halogen atom (e.g., chlorine, bromine, fluorine), a cyano group, and a nitro group.].

The compounds represented by formula (5) are described in more detail.

In formula (5), $Ar^1$, $Ar^2$ and $Ar^3$, which are the same or different, each represent a substituted or unsubstituted aryl group (preferably having 6 to 16 carbon atoms, e.g., phenyl, naphthyl, anthryl). A substituted or unsubstituted phenyl group is preferred of these groups. Examples of a substituent include an alkyl group (e.g., methyl, ethyl, butyl, dodecyl, cyclohexyl, trifluoromethyl), an aryl group (e.g., phenyl, naphthyl, anthryl), an alkoxy group (e.g., methoxy, ethoxy, dodecyloxy, benzyloxy, phenoxy), a halogen atom (e.g., chlorine, bromine, fluorine), a cyano group, and a nitro group.

Specific examples of the compound for use in the present invention are shown below, but the scope of the present invention is not limited to them.

| | |
|---|---|
| A-1 | $(CH_3O)_3B$ |
| A-2 | $(C_2H_5O)_3B$ |
| A-3 | $(C_3H_7O)_3B$ |
| A-4 | $(C_4H_9O)_3B$ |
| A-5 | $(C_5H_{11}O)_3B$ |
| A-6 | $(C_6H_{13}O)_3B$ |
| A-7 | $(C_7H_{15}O)_3B$ |
| A-8 | $(C_8H_{17}O)_3B$ |
| A-9 | $(C_9H_{19}O)_3B$ |
| A-10 | $(C_{10}H_{21}O)_3B$ |
| A-11 | $(C_{11}H_{23}O)_3B$ |
| A-12 | $(C_{12}H_{23}O)_3B$ |
| A-13 | $(ClCH_2CH_2O)_3B$ |
| A-14 | $(CH_2OCH_2O)_3B$ |
| A-15 | $(CH_3OCH_2CH_2O)_3B$ |
| A-16 | $(C_4H_9OCH_2CH_2O)_3B$ |
| A-17 | $(C_6H_5OCH_2CH_2O)_3B$ |
| A-18 | $(CH_3(CH_2)_8COCH_2CH_2O)_3B$ |
| A-19 | $(CH_3OCCH_2O)_3B$ |
| A-20 | $(CH_2{=}CHCH_2O)_3B$ |
| A-21 | (tetrahydrofurfuryloxy)$_3B$ |
| A-22 | (cyclohexyloxy)$_3B$ |
| A-23 | (benzyloxy)$_3B$ |
| A-24 | (2-phenyl-2-propyloxy)$_3B$ |
| B-1 | (phenoxy)$_3B$ |
| B-2 | (4-methylphenoxy)$_3B$ |
| B-3 | (4-tert-butylphenoxy)$_3B$ |
| B-4 | (4-cyclohexylphenoxy)$_3B$ |
| B-5 | (4-octylphenoxy)$_3B$ |

-continued
B-6 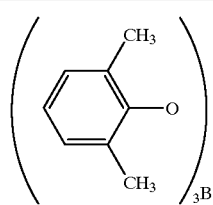
B-7 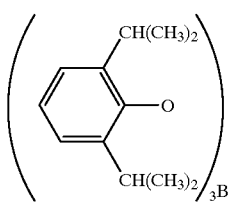
B-8 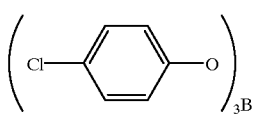
B-9 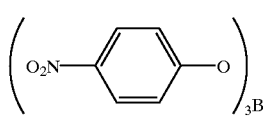
B-10 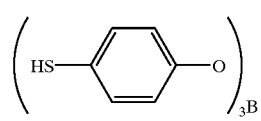
B-11 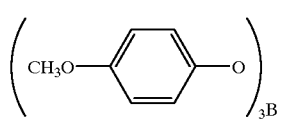
B-12 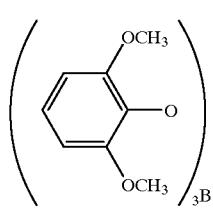
B-13 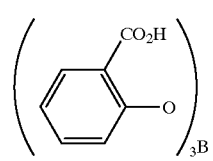
B-14 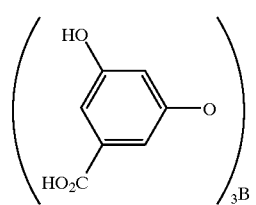
-continued
B-15 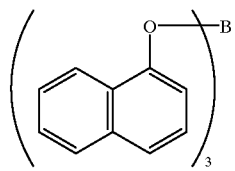
C-1 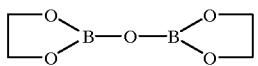
C-2 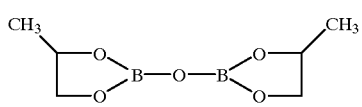
C-3 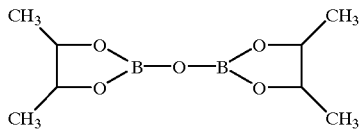
C-4 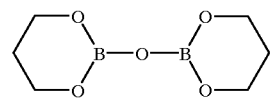
C-5 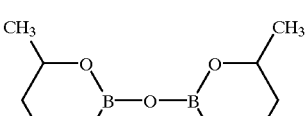
C-6 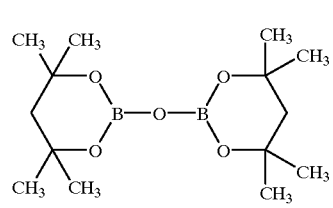
C-7 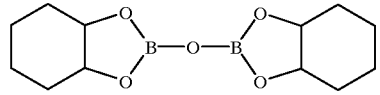
C-8 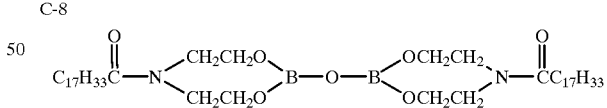
C-9 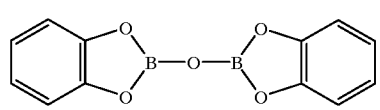
C-10 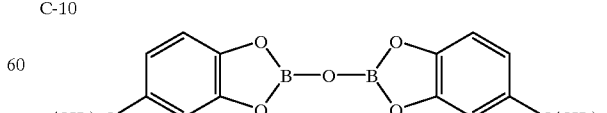
C-11 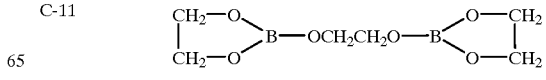

| | |
|---|---|
| C-12 | 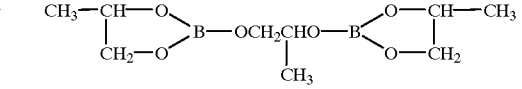 |
| C-13 | 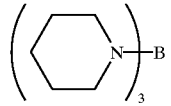 |
| C-14 | 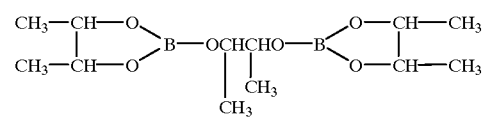 |
| C-15 | 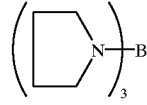 |
| C-16 | 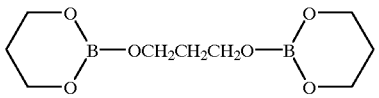 |
| C-17 | 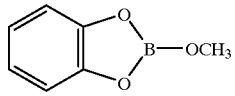 |
| C-18 |  |
| C-19 | 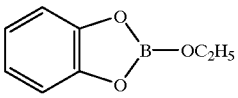 |
| C-20 | 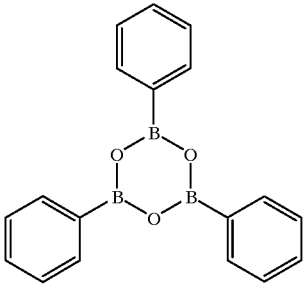 |
| C-21 | 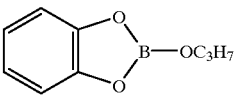 |
| D-1 | 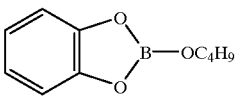 |
| D-2 | 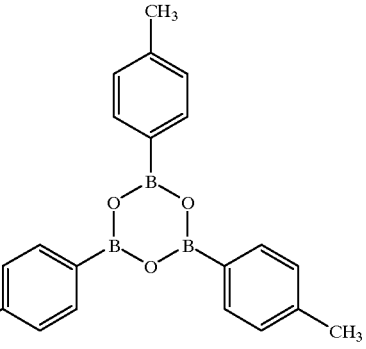 |
| D-3 | 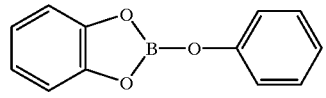 |
| D-4 | 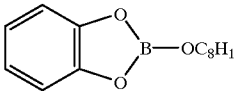 |
| D-5 | $(CH_3N)_3B$ |
| E-1 | 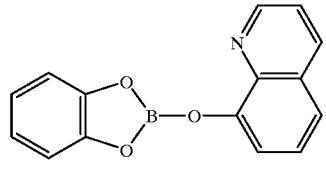 |
| E-2 | 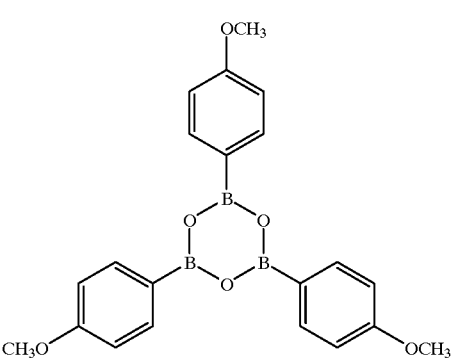 |
| E-3 | 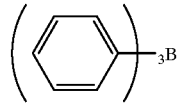 |

-continued
E-4
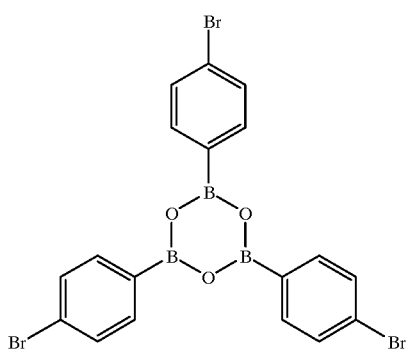
E-5
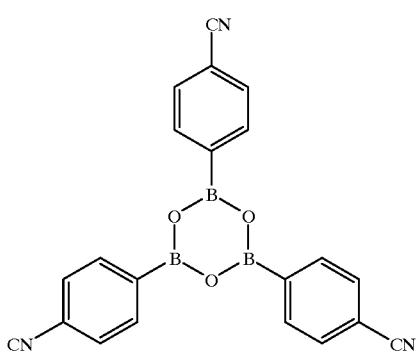
E-6
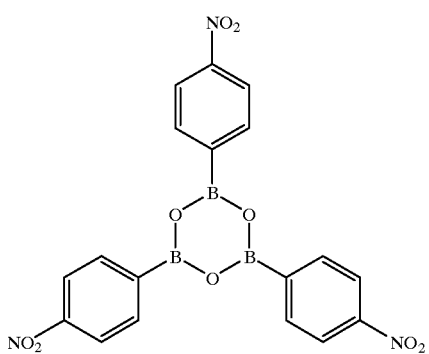
E-7
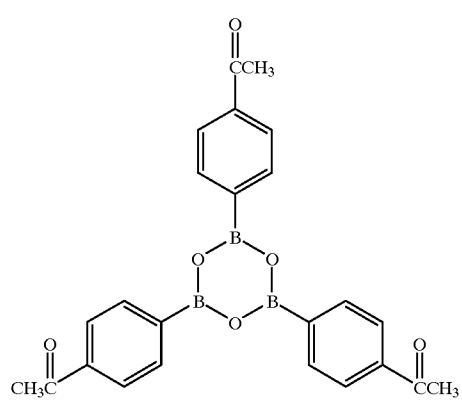
-continued
E-8
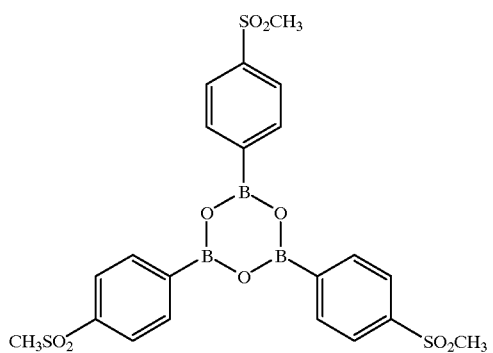
E-9
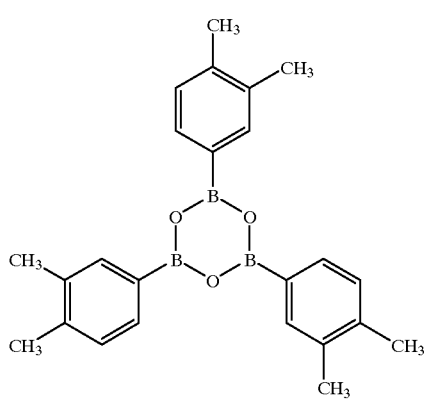
E10
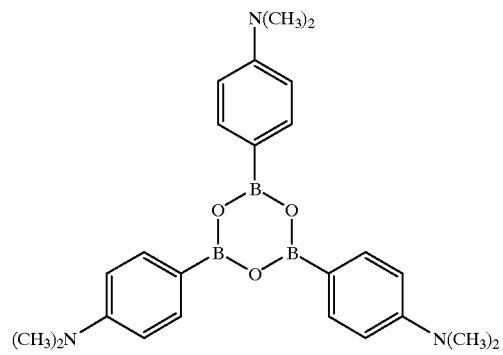
E-11
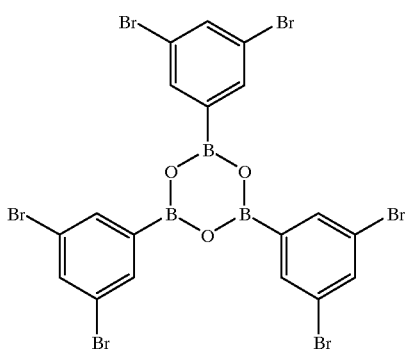

E-12
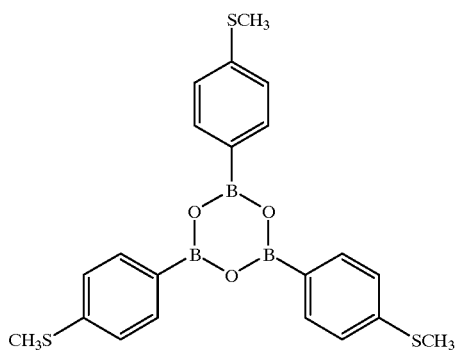
E-13
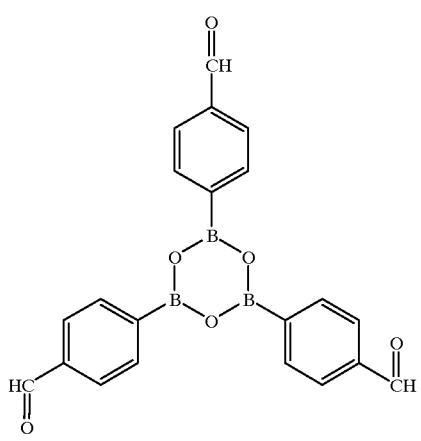
E-14
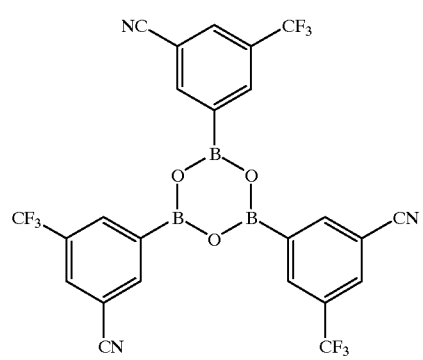
E-15
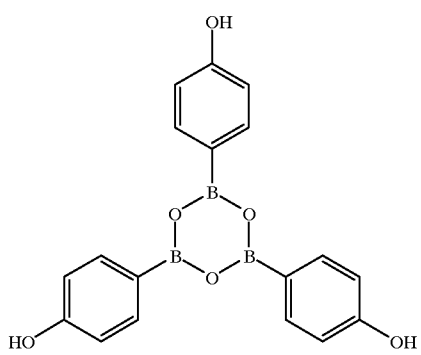
E-16
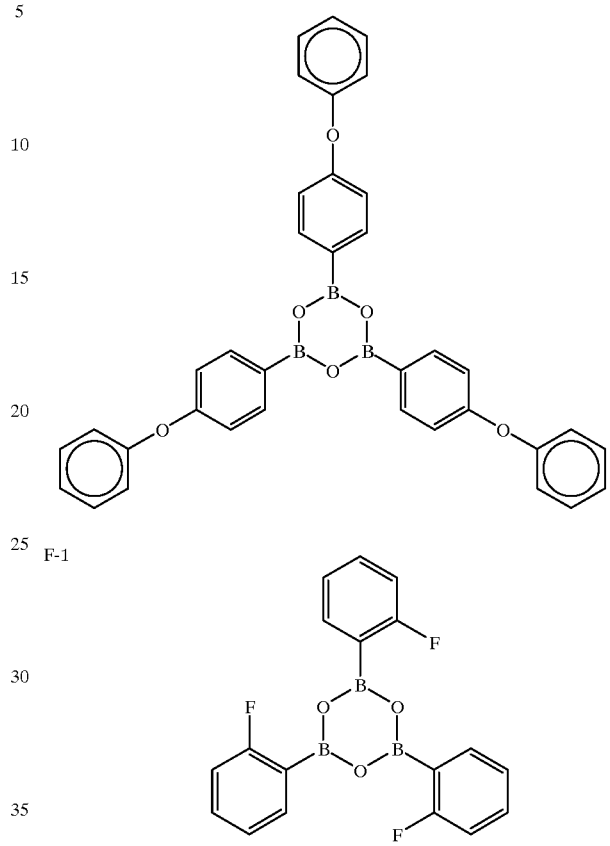
F-1
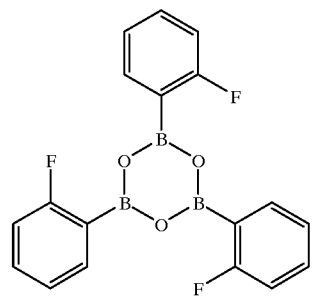
F-2
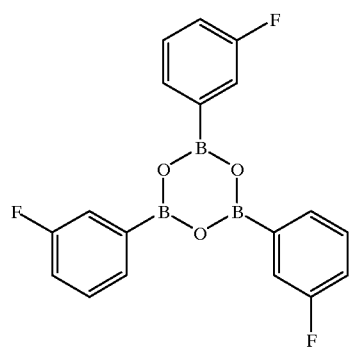
F-3
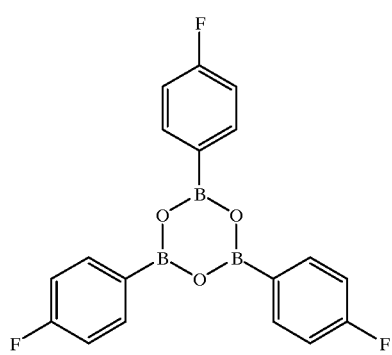

-continued
F-4
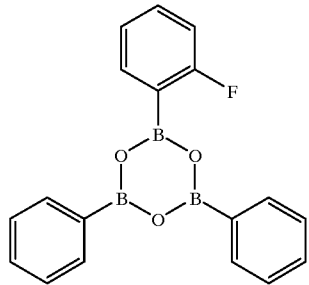
F-5
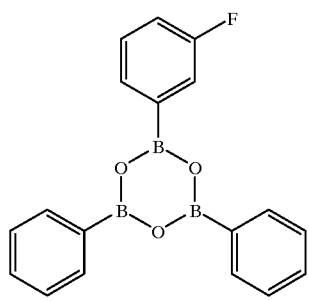
F-6
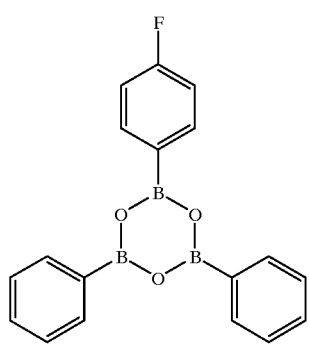
F-7
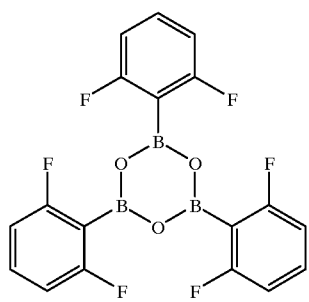
-continued
F-8
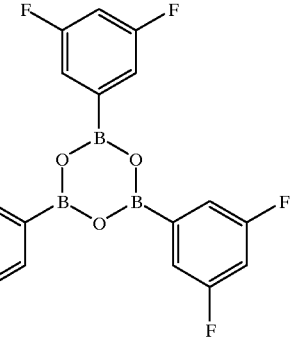
F-9
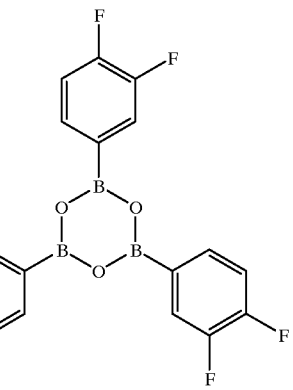
F-10
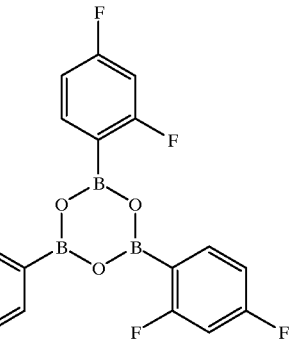
F-11
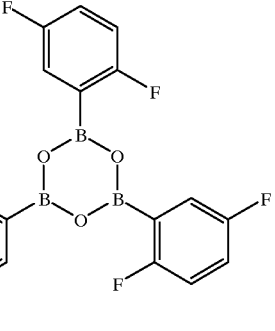

F-12
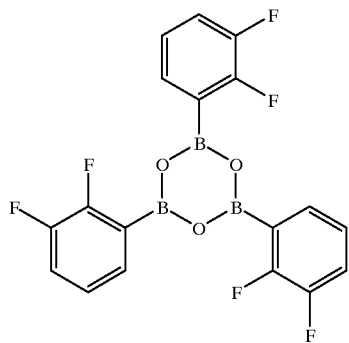
F-13
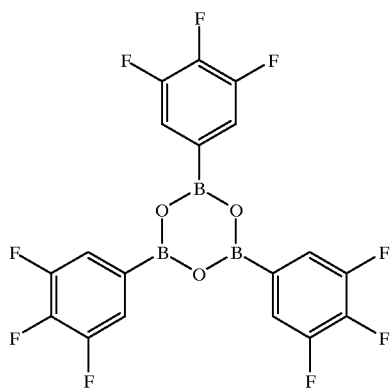
F-14
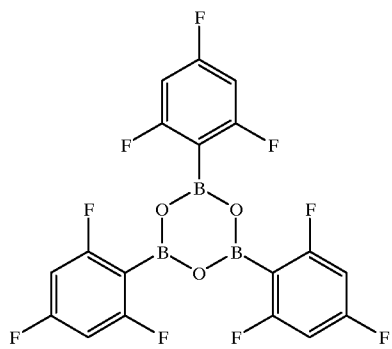
F-15
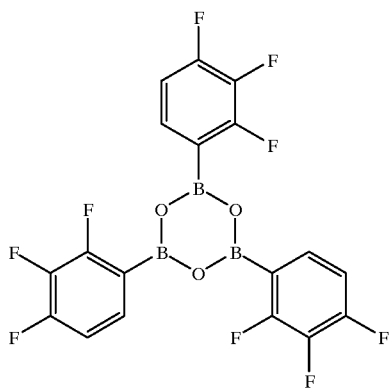
F-16
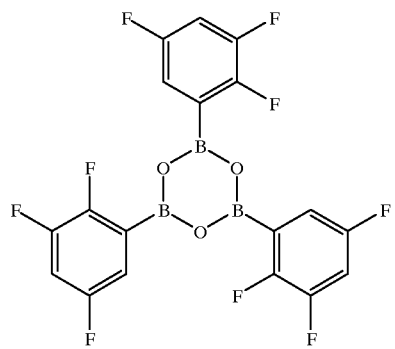
F-17
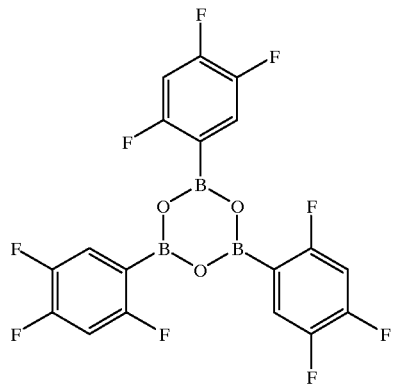
F-18
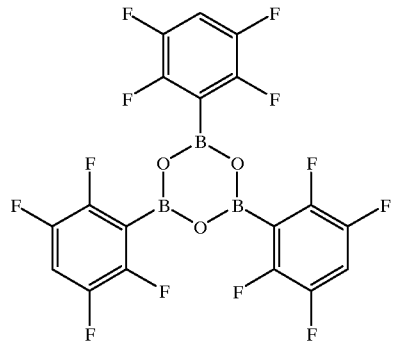
F-19
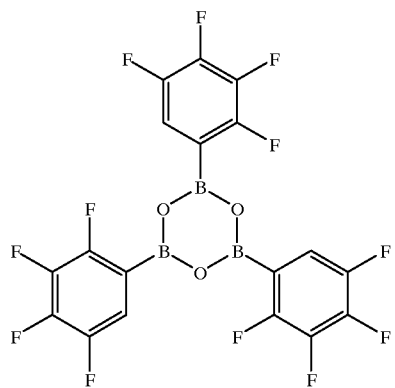

F-20 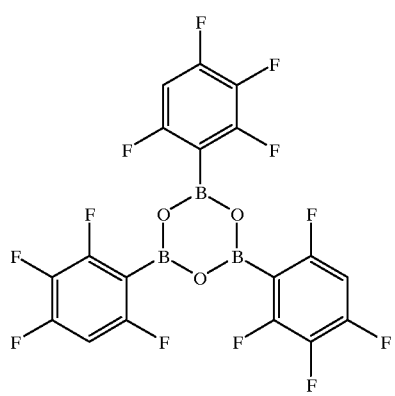
F-21 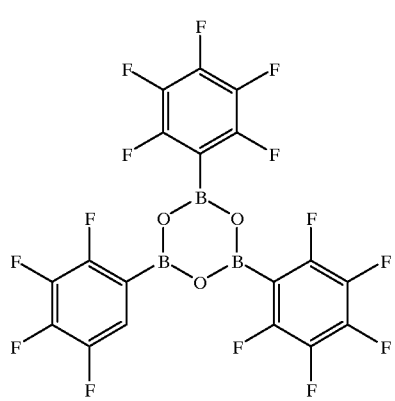
G-1 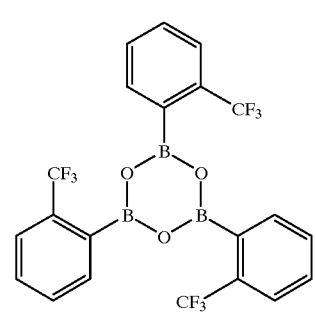
G-2 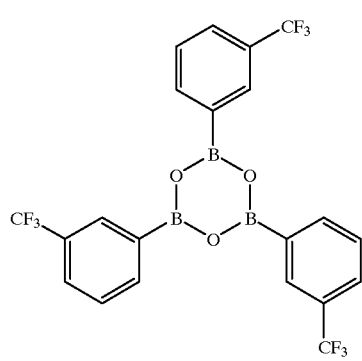
G-3 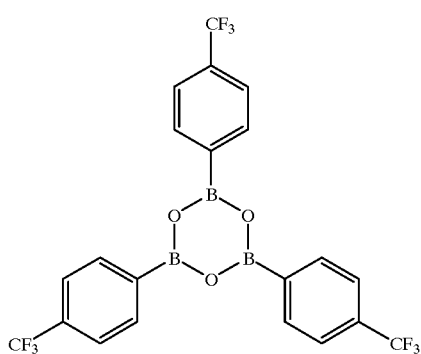
G-4 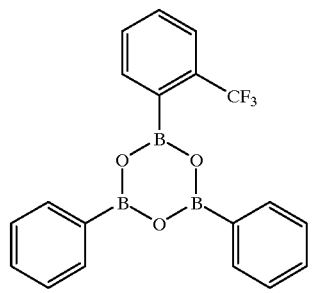
G-5 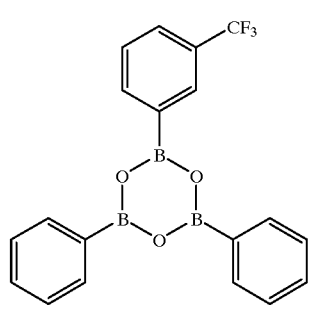
G-6 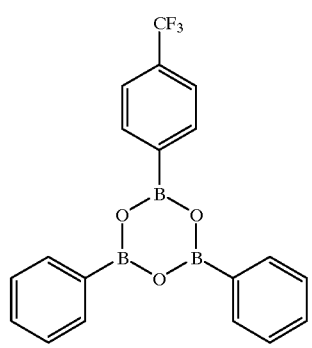

-continued

G-7 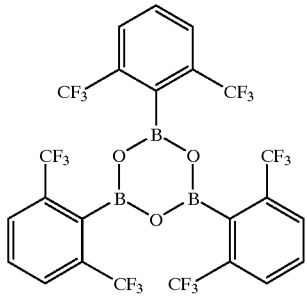

G-8 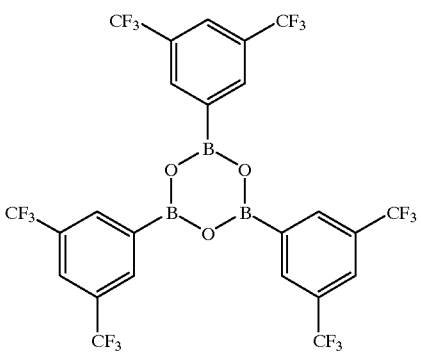

G-9 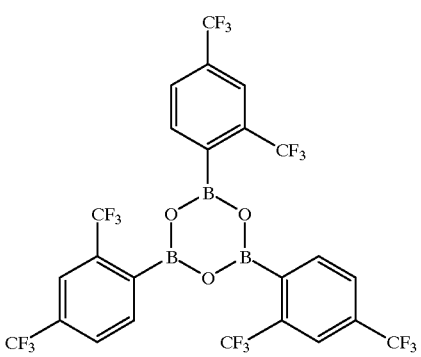

G-10 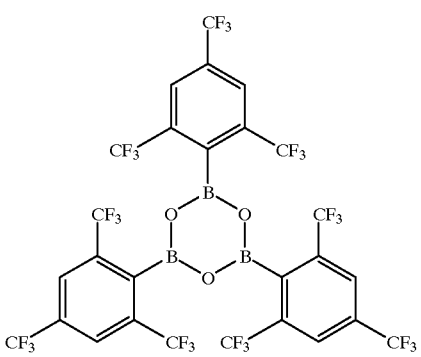

-continued

G-11 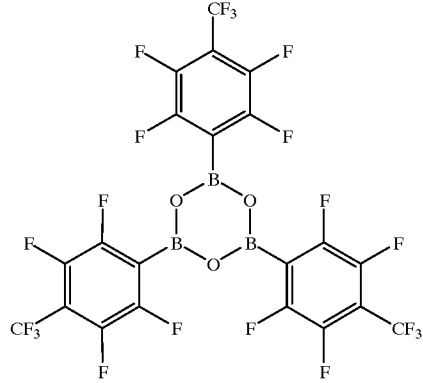

The organoboron compound for use in the present invention may be contained in any part of the battery. Preferably the organoboron compound is contained in an electrode-active material or an electrolytic solution. When the organoboron compound is contained in the electrode, the content thereof is preferably from 0.01 to 5 weight %, and more preferably from 0.1 to 2 weight %, to the active material in the electrode. When the organoboron compound is contained in an electrolytic solution, the content of the compound is preferably from 0.0001 to 0.1 mol/l, and more preferably from 0.001 to 0.1 mol/l, to the solvent in the electrolytic solution. Further, the content of the compound to a supporting electrolyte contained in the electrolytic solution is preferably from 0.001 to 10 weight %, and more preferably from 0.01 to 5 weight %.

The electrolytic solution is generally composed of a solvent and a supporting electrolyte dissolvable in that solvent. Preferably the supporting electrolyte is a lithium salt (made up of an anion and a lithium cation).

Examples of the solvent of the electrolytic solution that can be used in the present invention, include aprotic organic solvents, such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, dioxane, acetonitrile, nitromethane, ethyl monoglyme, phosphoric acid triesters, trimethoxymethane, dioxolane derivatives, sulfolane, 3-methyl-2-oxazolidinone, propylene carbonate derivatives, tetrahydrofuran derivatives, ethyl ether, and 1,3-propanesultone, which may be used alone or as a mixture of two or more. Among them, carbonate-series solvents are preferable, and those including cyclic carbonates and/or acyclic carbonates are preferable.

As the cyclic carbonate, ethylene carbonate and propylene carbonate are preferable. The acyclic carbonate includes preferably diethyl carbonate, dimethyl carbonate, and methyl ethyl carbonate.

As the lithium salts that can be used in the present invention and that is soluble in these solvents, can be mentioned such Li salts as $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lithium lower aliphatic carboxylates, $LiAlCl_4$, LiCl, LiBr, LiI, chloroborane lithium, and lithium tetraphenylborate, which may be used alone or as a mixture of two or more. Among these, one having $LiBF_4$ and/or $LiPF_6$ dissolved therein is preferable.

The concentration of the supporting electrolyte is not particularly limited, but preferably the concentration of the supporting electrolyte is 0.2 to 3 mol per liter of the electrolytic solution.

As the electrolytic solution that can be used in the present invention, an electrolytic solvent comprising $LiCF_3SO_3$, $LiClO_4$, $LiBF_4$, and/or $LiPF_6$ dissolved in ethylene carbonate, propylene carbonate, 1,2-dimethoxyethane, dimethyl carbonate, or diethyl carbonate suitably mixed to each other, is preferable. In particular, an electrolytic solution comprising $LiCF_3SO_3$, $LiClO_4$, $LiBF_4$, and/or $LiPF_6$ dissolved in a mixed solvent of propylene carbonate or ethylene carbonate, and 1,2-dimethoxyethane and/or diethyl carbonate, is preferable, with particular preference given to one comprising at least ethylene carbonate and $LIPF_6$.

The amount of these electrolytic solvents to be used in the battery is not particularly limited, and the required amount may depend on the amounts of the positive-electrode active material and the negative-electrode material and the size of the battery.

Now, other materials of which the nonaqueous-electrolytic solution secondary battery of the present invention is made, and the method of making the same, are described in detail. The positive and negative electrodes for use in the nonaqueous-electrolytic solution secondary battery of the present invention can be made by applying a positive electrode compound or a negative electrode compound on a current collector. The positive electrode compound or the negative electrode compound can contain, in addition to the positive-electrode active material or the negative-electrode material, a conducting agent, a binder, a dispersant, a filler, an ion-conducting material, a pressure-increasing agent, and various additives.

One of the negative-electrode materials for use in the present invention is a carbonaceous material that is capable of occluding and releasing lithium. The term "carbonaceous material" herein referred to means a material substantially composed of carbon, with examples including petroleum pitch, natural graphite, artificial graphite, soft graphite carbon, mesocarbonmicrobeads, PAN-series carbon fibers, cellulose-series carbon fibers, pitch-series carbon fibers, vapor phase-grown carbon fibers, dehydrated PVA-series carbon fibers, lignin carbon fibers, vitrified carbon fibers, and active carbon fibers.

Preferably, another negative-electrode material to be used in the present invention is an oxide of metal or semi-metal element, or chalcogen, which mainly composed of amorphous material when it is built in the battery.

Herein, the term "mainly amorphous" referred to means that the material has a broad scattering zone having the apex at 20° to 40° in terms of the 2θ value by X-ray diffractometry using a CuKα beam, and the material may have diffraction lines due to crystallinity. Preferably the strongest intensity in the diffraction lines due to crystallinity found in 40° or more, but 70° or less, in terms of the 2θ value, is 500 times or less, more preferably 100 times or less, and particularly preferably 5 times or less, the intensity of the diffraction line of the apex of the broad scattering zone found in 20° or more, but 40° or less, in terms of the 2θ value. Most preferably there are no diffraction line due to crystallinity.

Preferably, the negative electrode material for use in the present invention is represented by the following formula (6):

$$M^1 M^2 pM^4 qM^6 r \qquad \text{Formula (6)}$$

wherein $M^1$ and $M^2$, which are different from each other, each represent at least one selected from among Si, Ge, Sn, Pb, P, B, Al, and Sb, preferably Si, Ge, Sn, P, B, and Al, and particularly preferably Si, Sn, P, B, and Al; $M^4$ represents at least one selected from among Li, Na, K, Rb, Cs, Mg, Ca, Sr, and Ba, preferably K, Cs, Mg, and Ca, and particularly preferably Cs and Mg; $M^6$ represents at least one selected from among O, S, and Te, preferably O and S, and particularly preferably O; p and q are each 0.001 to 10, preferably 0.01 to 5, and particularly preferably 0.01 to 2; r is 1.00 to 50, preferably 1.00 to 26, and particularly preferably 1.02 to 6; the valence numbers of $M^1$ and $M^2$ are not particularly restricted, and each may be made up of a single valence number or a mixture of valence numbers; $M^1$, $M^2$, and $M^4$ are in such a ratio that $M^2$ and $M^4$ may be changed continuously in the range of 0.001 to 10 mol equivalents for $M^1$, and the amount of $M^6$ (the value of r in the formula (1)) is also changed in conformity to it.

Among the compounds mentioned above, preferably M is Sn in the present invention and it is represented by formula (7):

$$SnM^3 pM^5 qM^7 r \qquad \text{Formula (7)}$$

wherein $M^3$ represents at least one selected from the group consisting of Si, Ge, Pb, P, B, and Al, preferably Si, Ge, P, B, and Al, and particularly preferably Si, P, B, and Al; $M^5$ represents at least one selected from the group consisting of Li, Na, K, Rb, Cs, Mg, Ca, Sr, and Ba, preferably Cs and Mg, and particularly preferably Mg; $M^7$ represents at least one selected from the group consisting of O and S, and preferably O; p and q are each 0.001 to 10, preferably 0.01 to 5, more preferably 0.01 to 1.5, and particularly preferably 0.7 to 1.5; and r is 1.00 to 50, preferably 1.00 to 26, and particularly preferably 1.02 to 6.

Examples of the negative electrode material for use in the present invention are shown below, but the present invention is not limited to them.

$SnAl_{0.4}B_{0.5}P_{0.5}K_{0.1}O_{3.65}$, $SnAl_{0.4}B_{0.5}P_{0.5}Na_{0.2}O_{3.7}$,
$SnAl_{0.4}B_{0.3}P_{0.5}Rb_{0.2}O_{3.4}$, $SnAl_{0.4}B_{0.5}P_{0.5}Cs_{0.1}O_{3.65}$,
$SnAl_{0.4}B_{0.5}P_{0.5}K_{0.1}Ge_{0.05}O_{3.85}$,
$SnAl_{0.4}B_{0.5}P_{0.5}K_{0.1}Mg_{0.1}Ge_{0.02}O_{3.83}$, $SnAl_{0.4}B_{0.4}P_{0.4}O_{3.2}$,
$SnAl_{0.3}B_{0.5}P_{0.2}O_{2.7}$, $SnAl_{0.3}B_{0.5}P_{0.2}O_{2.7}$,
$SnAl_{0.4}B_{0.5}P_{0.3}Ba_{0.08}Mg_{0.08}O_{3.26}$,
$SnAl_{0.4}B_{0.4}P_{0.4}Ba_{0.08}O_{3.28}$, $SnAl_{0.4}B_{0.5}P_{0.5}O_{3.6}$,
$SnAl_{0.4}B_{0.5}P_{0.5}Mg_{0.1}O_{3.7}$, $SnAl_{0.5}B_{0.4}P_{0.5}Mg_{0.1}F_{0.2}O_{3.65}$,
$SnB_{0.5}P_{0.5}Li_{0.1}Mg_{0.1}F_{0.2}O_{3.05}$,
$SnB_{0.5}P_{0.5}K_{0.1}Mg_{0.1}F_{0.2}O_{3.05}$,
$SnB_{0.5}P_{0.5}K_{0.05}Mg_{0.05}F_{0.10}O_{3.03}$,
$SnB_{0.5}P_{0.5}K_{0.05}Mg_{0.1}F_{0.2}O_{3.03}$,
$SnAl_{0.4}B_{0.5}P_{0.5}Cs_{0.1}Mg_{0.1}F_{0.2}O_{3.65}$,
$SnB_{0.5}P_{0.5}Cs_{0.05}Mg_{0.05}F_{0.1}O_{3.03}$, $SnB_{0.5}P_{0.5}Mg_{0.1}F_{0.1}O_{3.05}$,
$SnB_{0.5}P_{0.5}Mg_{0.1}F_{0.2}O_3$, $SnB_{0.5}P_{0.5}Mg_{0.1}F_{0.06}O_{3.07}$,
$SnB_{0.5}P_{0.5}Mg_{0.1}F_{0.14}O_{3.03}$, $SnPBa_{0.08}O_{3.58}$, $SnPK_{0.1}O_{3.55}$,
$SnPK_{0.05}Mg_{0.05}O_{3.58}$, $SnPCs_{0.1}O_{3.55}$, $SnPBa_{0.08}F_{0.08}O_{3.54}$,
$SnPK_{0.1}Mg_{0.1}F_{0.2}O_{3.55}$, $SnPK_{0.05}Mg_{0.05}F_{0.1}O_{3.53}$,
$SnPCs_{0.1}Mg_{0.1}F_{0.2}O_{3.55}$, $SnPCs_{0.05}Mg_{0.05}F_{0.1}O_{3.53}$,
$Sn_{1.1}Al_{0.4}B_{0.2}P_{0.6}Ba_{0.08}F_{0.08}O_{3.54}$,
$Sn_{1.1}Al_{0.4}B_{0.2}P_{0.6}Li_{0.1}K_{0.1}Ba_{0.1}F_{0.1}O_{3.65}$,
$Sn_{1.1}Al_{0.4}B_{0.4}P_{0.4}Ba_{0.08}O_{3.34}$, $Sn_{1.1}Al_{0.4}PCs_{0.05}O_{4.23}$,
$Sn_{1.1}Al_{0.4}PK_{0.05}O_{4.23}$, $Sn_{1.2}Al_{0.5}B_{0.3}P_{0.4}Cs_{0.2}O_{3.5}$, $Sn_{1.2}Al_{0.4}B_{0.2}P_{0.6}Ba_{0.08}O_{3.68}$,
$Sn_{1.2}Al_{0.4}B_{0.2}P_{0.6}Ba_{0.08}F_{0.08}O_{3.64}$,
$Sn_{1.2}Al_{0.4}B_{0.2}P_{0.6}Mg_{0.04}Ba_{0.04}O_{3.68}$,
$Sn_{1.2}Al_{0.4}B_{0.3}P_{0.5}Ba_{0.08}O_{3.58}$,
$Sn_{1.3}Al_{0.3}B_{0.3}P_{0.4}Na_{0.2}O_{3.3}$, $Sn_{1.3}Al_{0.2}B_{0.4}P_{0.4}Ca_{0.2}O_{3.4}$,
$Sn_{1.3}Al_{0.4}B_{0.4}P_{0.4}Ba_{0.2}O_{3.6}$, $Sn_{1.4}Al_{0.4}PK_{0.2}O_{4.6}$,
$Sn_{1.4}Al_{0.2}Ba_{0.1}PK_{0.2}O_{4.45}$, $Sn_{1.4}Al_{0.2}Ba_{0.2}PK_{0.2}O_{4.6}$,
$Sn_{1.4}Al_{0.4}Ba_{0.2}PK_{0.2}Ba_{0.1}F_{0.2}O_{4.9}$, $Sn_{1.4}Al_{0.4}PK_{0.3}O_{4.65}$,
$Sn_{1.5}Al_{0.2}PK_{0.2}O_{4.4}$, $Sn_{1.5}Al_{0.4}PK_{0.1}O_{4.65}$,
$Sn_{1.5}Al_{0.4}PCs_{0.05}O_{4.63}$, $Sn_{1.5}Al_{0.4}PCs_{0.05}Mg_{0.1}F_{0.2}O_{4.63}$,
$SnSi_{0.5}Al_{0.1}B_{0.2}P_{0.1}Ca_{0.4}O_{3.1}$, $SnSi_{0.4}Al_{0.2}B_{0.4}O_{2.7}$,
$SnSi_{0.5}Al_{0.2}B_{0.1}P_{0.1}Mg_{0.1}O_{2.8}$, $SnSi_{0.6}Al_{0.2}B_{0.2}O_{2.8}$,
$SnSi_{0.5}Al_{0.3}B_{0.4}P_{0.2}O_{3.55}$, $SnSi_{0.5}Al_{0.3}B_{0.4}P_{0.5}O_{4.30}$,
$SnSi_{0.6}Al_{0.1}B_{0.1}P_{0.3}O_{3.25}$, $SnSi_{0.6}Al_{0.1}B_{0.1}P_{0.1}Ba_{0.2}O_{2.95}$,
$SnSi_{0.6}Al_{0.1}B_{0.1}P_{0.1}Ca_{0.2}O_{2.95}$, $SnSi_{0.6}Al_{0.4}B_{0.2}Mg_{0.1}O_{3.2}$,
$SnSi_{0.6}Al_{0.1}B_{0.3}P_{0.1}O_{3.05}$, $SnSi_{0.6}Al_{0.2}Mg_{0.2}O_{2.7}$,
$SnSi_{0.6}Al_{0.2}Ca_{0.2}O_{2.7}$, $SnSi_{0.6}Al_{0.2}P_{0.2}O_{3}$,
$SnSi_{0.6}B_{0.2}P_{0.2}O_{3}$, $SnSi_{0.8}Al_{0.2}O_{2.9}$,
$SnSi_{0.8}Al_{0.3}B_{0.2}P_{0.2}O_{3.85}$, $SnSi_{0.8}B_{0.2}O_{2.9}$,
$SnSi_{0.8}Ba_{0.2}O_{2.8}$, $SnSi_{0.8}Mg_{0.2}O_{2.8}$, $SnSi_{0.8}Ca_{0.2}O_{2.8}$,
$SnSi_{0.8}P_{0.2}O_{3.1}$, $Sn_{0.9}Mn_{0.3}B_{0.4}P_{0.4}Ca_{0.1}Rb_{0.1}O_{2.95}$,
$Sn_{0.9}Fe_{0.3}B_{0.4}P_{0.4}Ca_{0.1}Rb_{0.1}O_{2.95}$,
$Sn_{0.8}Pb_{0.2}Ca_{0.1}P_{0.9}O_{3.35}$, $Sn_{0.3}Ge_{0.7}Ba_{0.1}P_{0.9}O_{3.35}$,
$Sn_{0.9}Mn_{0.1}Mg_{0.1}P_{0.9}O_{3.35}$, $Sn_{0.2}Mn_{0.8}Mg_{0.1}P_{0.9}O_{3.35}$,
$Sn_{0.7}Pb_{0.3}Ca_{0.1}P_{0.9}O_{3.35}$, and $Sn_{0.2}Ge_{0.8}Ba_{0.1}P_{0.9}O_{3.35}$.

The chemical formulae of the above compounds obtained by baking can be determined by inductively coupled plasma (ICP) emission spectrochemical analysis, or simply from the difference in weight of the powder before and after the baking.

To the negative electrode material for use in the present invention, lithium ion can be inserted in the battery before and/or after the assemble of the battery. The amount of insertion of lithium into the negative electrode material for use in present invention may be such that it reaches approximately to the deposition potential of that lithium, and, for example, preferably the amount is 50 to 700 mol %, and particularly preferably 100 to 600 mol %, based on the negative electrode material. The larger the emission amount to the insertion amount is, the more preferable it is. The method of insertion of a light metal is preferably an electrochemical method, a chemical method, or a thermal method. As the electrochemical method, a method in which a light metal contained in a positive electrode active material is electrochemically inserted, or a method in which a light metal or a light metal from its alloy is directly inserted electrochemically is preferable. As the chemical method, a method wherein a light metal is mixed or contacted with the negative electrode material, or an organometallic compound, such as butyl lithium, is reacted with the negative electrode material. The electrochemical method and the chemical method are preferable.

In the present invention, using the compounds represented by the above formula (6) or (7) as a main negative electrode material, a non-aqueous-electrolytic solution secondary battery excellent in charge and discharge cycle characteristics, high in discharge voltage, capacity, and safety, and excellent in high-electric current properties, can be obtained. In the present invention, when a compound containing Sn, with the Sn's valence number being 2, is used as a negative electrode material, a particularly excellent effect can be obtained. The valence number of Sn can be found by chemical titration, for example, by a method described in *Physics and Chemistry of Glasses*, Vol. 8, No. 4 (1967), page 165. The valence number can also be determined from Knight Shift by the measurement of Sn by solid nuclear magnetic resonance (NMR). For example, in broad-line NMR measurement, for $Sn(CH_3)_4$, metal Sn (zero-valent Sn) has peaks appearing near 7,000 ppm, which is at an extremely low-magnetic field, SnO (bivalence) has a peak near 100 ppm, and $SnO_2$ (tetravalence) has a peak appearing near −600 ppm. Thus, if they have the same ligands, Knight Shift depends largely on the valence number of the central metal Sn, and the valence number can be determined based on the position of the peak obtained by the $^{119}$Sn-NMR measurement.

Various compounds can be contained in the negative electrode material used in the present invention. For example, transition metals (Sc, Ti, V, Cr, Mn, Fe, Co, Ni, Cu, Zn, Y, Zr, Nb, Mo, Tc, Ru, Rh, Pd, Ag, Cd, lanthanides, Hf, Ta, W, Re, Os, Ir, Pt, Au, and Hg) and elements of Group 17 (F, Cl) of the Periodic Table can be contained. As a dopant various compounds that can increase electron conductivity (e.g. compounds of Sb, In, and Nb) can also be contained. The amount of the compound that may be added is preferably 0 to 20 mol %.

As the method of synthesizing a composite oxide mainly composed of an oxide represented by the formula (6) or (7) in the present invention, either of a baking method and a solution method can be used.

For example, more particularly, in the case of the baking method, an $M^1$ compound, an $M^2$ compound, and an $M^4$ compound ($M^1$ and $M^2$, which are different from each other, each represent Si, Ge, Sn, Pb, P, B, Al, or Sb, and $M^4$ represents Mg, Ca, Sr, or Ba) may be mixed and baked. Examples of the Sn compound include SnO, $SnO_2$, $Sn_2O_3$, $Sn_3O_4$, $Sn_7O_{13} \cdot H_2O$, $Sn_8O_{15}$, stannous hydroxide, stannic oxyhydroxide, stannic acid, stannous oxalate, stannous phosphate, orthostannic acid, metastannic acid, parastannic acid, stannous fluoride, stannic fluoride, stannous chloride, stannic chloride, stannous pyrophosphate, tin phosphide, stannous sulfide, and stannic sulfide.

Examples of the Si compound include $SiO_2$, SiO; organosilicon compounds, such as tetremethylsilane and tetraethylsilane; alkoxysilane compounds, such as tetramethoxysilane and tetraethoxysilane; and hydrosilane compounds, such as trichlorohydrosilane.

Examples of the Ge compound include $GeO_2$, GeO, and alkoxy germanium compounds, such as germanium tetramethoxide and germanium tetraethoxide.

Examples of the Pb compound include $PbO_2$, PbO, $Pb_2O_3$, $Pb_3O_4$, lead nitrate, lead carbonate, lead formate, lead acetate, lead tetraacetate, lead tartrate, lead diethoxide, and lead di(isopropoxide).

Examples of the P compound include phosphorus pentoxide, phosphorus oxychloride, phosphorus pentachloride, phosphorus trichloride, phosphorus tribromide, trimethyl phosphate, triethyl phosphate, tripropyl phosphate, stannous pyrophosphate, and boron phosphate.

Examples of the B compound include diboron trioxide, boron trichloride, boron tribromide, boron carbide, boric acid, trimethyl borate, triethyl borate, tripropyl borate, tributyl borate, boron phosphide, and boron phosphate.

Examples of the Al compound include aluminum oxide (a-alumina and β-alumina), aluminum silicate, aluminum-tri-iso-propoxide, aluminum tellurite, aluminum chloride, aluminum boride, aluminum phosphide, aluminum phosphate, aluminum lactate, aluminum borate, aluminum sulfide, aluminum sulfate, and aluminum boride.

Examples of the Sb compound include diantimony trioxide and triphenylanitimony.

Examples of the Mg, Ca, Sr, and Ba compounds include various oxides, hydroxides, carbonates, phosphates, sulfates, nitrates, and aluminum compounds.

The baking conditions are such that preferably the heating rate is 4° C. or more, but 2,000° C. or less; more preferably 6° C. or more, but 2,000° C. or less; and particularly preferably 10° C. or more, but 2,000° C. or less, per min; preferably the baking temperature is 250° C. or more, but 1,500° C. or less; more preferably 350° C. or more, but 1,500° C. or less; and particularly preferably 500° C. or more, but 1,500° C. or less; preferably the baking time is 0.01 hour or more, but 100 hours or less; more preferably 0.5 hour or more, but 70 hours or less; and particularly preferably 1 hour or more, but 20 hours or less; and preferably the cooling rate is 2° C. or more, but 107° C. or less; more preferably 4° C. or more, but 107° C. or less; particularly preferably 6° C. or more, but 107° C. or less; and more particularly preferably 10° C. or more, but 107° C. or less, per min.

In the present invention, the term "heating rate" means the average rate of the temperature rise from "50% of the baking temperature in ° C." to "80% of the baking temperature in ° C.," and the term "cooling rate" means the average rate of the temperature descent from "80% of the baking temperature in ° C." to "50% of the baking temperature in ° C."

The cooling may be carried out in a baking furnace, or it may be carried out in such a manner that the product is taken out of the furnace and is charged into, for example, water, to be cooled. Ultra-rapid cooling methods, such as the gun method, the Hammer-Anvil method, the slap method, the gas atomizing method, the plasma spray method, the centrifugal quenching method, and the melt drag method, described in *Ceramic Processing* (Gihodo-shuppan, 1987), page 217, can be used. The cooling also can be carried out by using the single roller method or the twin roller method, described in *New Glass Handbook* (Maruzen, 1991), page 172. When the material is melted during the baking, the baked product may be taken out continuously while the raw material is supplied during the baking. When the material is melted during the baking, preferably the melt is stirred.

Preferably the baking gas atmosphere has an oxygen content of 5 vol.% or less, and more preferably it is an inert gas atmosphere. The inert gas may be, for example, nitrogen, argon, helium, krypton, and xenon.

Preferably the average particle size of the compounds represented by the formula (6) or (7) for use in the present invention is 0.1 to 60 $\mu$m, more preferably 1.0 to 30 $\mu$m, and particularly preferably 2.0 to 20 $\mu$m. To secure a prescribed particle size, a well-known crusher and classifier can be used. For example, a mortar, a ball mill, a sand mill, a vibration ball mill, a satellite ball mill, a planetary ball mill, a swirl airflow-type jet mill, a screen, and the like can be used. The grinding may be carried out in the presence of water or an organic solvent, such as methanol; that is, the grinding may be carried out, if necessary, in a wet manner. To secure a desired particle diameter, it is preferable to carry out classification. The classification method is not particularly limited, and for the classification, screens, an air classifier, water elutriation, and the like can be used as desired. The classification may be carried out in either a wet manner or dry manner.

A more preferable lithium-containing transition metal oxide positive-electrode material for use in the present invention is synthesized preferably by mixing, such that the mole ratio of the sum of the lithium compound/transition metal compound (wherein the transition metal means at least one selected from among Ti, V, Cr, Mn, Fe, Co, Ni, Mo, and W) is from 0.3 to 2.2. A particularly preferable lithium-containing transition metal oxide positive-electrode material for use in the present invention is synthesized preferably by mixing, such that the mole ratio of the sum of the lithium compound/transition metal compound (wherein the transition metal means at least one selected from the group of V, Cr, Mn, Fe, Co and Ni) is from 0.3 to 2.2.

A more particularly preferable lithium-containing transition metal oxide positive-electrode material for use in the present invention is $Li_xQO_y$ (wherein Q represents mainly transition metals, at least one of which comprises Co, Mn, Ni, V, or Fe, and x=0.2 to 1.2, and y=1.4 to 3). Q may contain, in addition to transition metals, for example, Al, Ga, In, Ge, Sn, Pb, Sb, Bi, Si, P, or B mixed therein. Preferably the amount to be mixed is 0 to 30 mol %, to the transition metal.

Examples of a more preferable lithium-containing metal oxide positive-electrode material for use in the present invention include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCO_{2-c}O_4$, $Li_xMn_cNi_{2-c}O_4$, $Li_xMn_cV_{2-c}O_4$, and $Li_xMn_cFe_{2-c}O^4$ (wherein x=0.7 to 1.2, a=0.1 to 0.9, b=0.8 to 0.98, c=1.6 to 1.96, and z=2.01 to 2.3).

Examples of the most preferable lithium-containing transition metal oxide positive-electrode material for use in the present invention include $Li_xCoO_2$, $Li_xNiO_2$, $Li_xMnO_2$, $Li_xCO_aNi_{1-a}O_2$, $Li_xMn_2O_4$, and $Li_xCo_bV_{1-b}O_z$ (wherein x=0.7 to 1.2, a=0.1 to 0.9, b=0.9 to 0.98, and z=2.01 to 2.3).

The above value of x is the value before the start of charging/discharging, and it will change due to charging/discharging.

The conductive carbon compound that can be used in the present invention is any electron-conducting material that will not undergo a chemical change in the assembled battery. Specific examples include natural graphites, such as flaky graphite, plate-like graphite, and massive graphite; high-temperature sintered products obtained, for example, from petroleum coke, coal coke, celluloses, saccharides, and mesophase pitch; graphites, such as artificial graphites, including vapor phase-grown graphite; carbon blacks, such as acetylene black, furnace black, Ketjen black, channel black, lamp black, and thermal black; asphalt pitch, coal tar, active carbon, mesophase pitch, and polyacetylenes. Among these, graphites and carbon blacks are preferable.

As conducting agents other than the carbon-series conducting agents, conductive fibers, such as metal fibers; metal powders, for example, of copper, nickel, aluminum, or silver; conductive whiskers, for example, of zinc oxide and potassium titanate; and conductive metal oxides, such as titanium oxide, which are used singly or as a mixture of them, if necessary, can be contained.

The amount of the conducting agent to be added to the composition layer is preferably 6 to 50 wt. %, and particularly preferably 6 to 30 wt. %, based on the negative electrode material or the positive electrode material. In the case of carbon or graphite, that amount is particularly preferably 6 to 20 wt. %.

As the binding agent for retaining the electrode composition for use in the present invention, polysaccharides, thermoplastic resins, and elastic polymers can be used, singly or as a mixture of them. Example of preferable binding agents are water-soluble polymers, such as starches, carboxymethylcellulose, cellulose, diacetylcellulose, methylcellulose, hydroxyethylcellulose, hydroxypropylcellulose, sodium alginate, polyacrylic acid, sodium polyacrylate, polyvinylphenol, polyvinyl methyl ether, polyvinyl alcohol, polyvinyl pyrrolidone, polyacrylamide, polyhydroxy(metha)acrylate, and styrene/maleic acid copolymers; polyvinyl chloride, polytetrafluoroethylene, polyvinylidene fluoride, tetrafluoroethylene/hexafluoropropylene copolymers, vinylidenefluoride/tetrafluoroethylene/hexafluoropropylene copolymers, polyethylene, polypropylene, ethylene/propylene/diene terpolymers (EPDM), sulfonated EPDM, polyvinyl acetal resin; (meth)acrylate copolymers containing a (meth)acrylate, such as methyl methacrylate and 2-ethylhexyl acrylate; polyvinyl ester copolymers containing a vinyl ester, such as (meth)acrylate/acrylonitrile copolymers and vinyl acetate; styrene/butadiene copolymers, acrylonitrile/butadiene copolymers, polybutadiene, neoprene rubber, fluoro rubber, polyethylene oxide, polyester polyurethane resin, polyether polyurethane resin, polycarbonate polyurethane resin, polyester resin, phenolic resin, and epoxy resin, which are used in the form of an emulsion (latex) or a suspension. Particularly preferable are latexes of polyacrylate, carboxymethylcellulose, polytetrafluoroethylene, and polyvinylidene fluoride.

These binding agents may be used singly or as a mixture of them. If the amount of the binding agent to be added is small, the holding power/cohesive power of the electrode compound is weak and the cycle properties are poor. If the amount of the binding agent to be added is excessive, the volume of the electrode is increased, to decrease the capacity per unit volume or unit weight of the electrode, and the conductivity is lowered, to decrease further the capacity. The amount of the binding agent to be added is not particularly limited, but preferably the amount of the binding agent to be added is 1 to 30 wt. %, and particularly preferably 2 to 10 wt. %, based on the total weight of coating composition.

Preferably the preparation of the negative electrode composition paste or the positive electrode composition paste in the present invention is carried out in an aqueous system.

The preparation of the composition paste can be carried out first by mixing an active material and a conducting agent, adding a binding agent (a resin powder made into a form of a suspension or emulsion (latex)) and water thereto, kneading them, and then dispersing them with a stirring machine/dispersing machine, such as a mixer, a homogenizer, a dissolver, a planetary mixer, a paint shaker, and a sand mill.

The prepared composition paste of the positive-electrode active material or the negative-electrode active material is used by mainly applying (coating) it onto a current collector, followed by drying and compression. The coating can be carried out in various ways, and example coating methods include the reverse roll method, the direct roll method, the blade method, the knife method, the extrusion method, the curtain method, the gravure method, the bar method, the dip method, and the squeeze method. The blade method, the knife method, and the extrusion method are preferable. The coating is preferably carried out at a rate of 0.1 to 100 m/min. By choosing one of the above coating methods in accordance with the liquid physical properties and drying characteristics of the composition paste, a good surface state of the coating layer can be obtained. The thickness, the length, and the width of the coating will be determined depending on the size of the battery. Particularly preferably, the thickness of the coating after drying and compression is 1 to 2,000 $\mu$m.

As the drying or dehydration method for removing moisture of the pellets or the sheet, a usually adopted method can be used, and, for example, one or a combination of hot air, a vacuum, an infrared ray, a far infrared ray, an electron beam, and low-humidity air can be used. Preferably the temperature is in the range of 80 to 350° C., and particularly preferably in the range of 100 to 250° C. The water content is preferably 2,000 ppm or less based on the whole battery, and the water content of each of the positive electrode compound, the negative electrode compound, and the electrolytic solution is preferably 500 ppm or less, in view of the charge and discharge cycle characteristics.

To compress the electrode compound in the form of a sheet, a usually employed press method can be used, and particularly the mold press method and the calender press method are preferable. The pressing pressure is not particularly limited and is preferably 10 kg/cm$^2$ to 3 t/cm$^2$. The pressing speed of the calender press method is preferably 0.1 to 50 m/min. The pressing temperature is preferably room temperature to 200° C.

With respect to the material of the support, that is, the current collector, of the positive electrode or the negative electrode that can be used for the present invention, in the case of the positive electrode, its material is aluminum, a stainless steel, nickel, titanium, or an alloy of these metals, and in the case of the negative electrode, the material is copper, a stainless steel, nickel, titanium, or an alloy of these metals. The form of the electrode is foil, expanded metal, punching metal, or wire mesh. Particularly preferably, the positive electrode is in the form of aluminum foil, and the negative electrode is in the form of copper foil.

As the separator that can be used in the present invention, an insulating thin film that is high in ion permeability and that has a prescribed mechanical strength, is suitable. As the material of the separator, an olefin-series polymer, a fluorine-containing polymer, a cellulose-series polymer, a polyimide, an polyamide (nylon) glass fiber, or alumina fiber, in the form of a nonwoven fabric, a woven fabric, or a microporous film, can be used. Particularly as its material, a polypropylene, a polyethylene, a mixture of a polypropylene and a polyethylene, a mixture of a polypropylene and Teflon (trade name, polytetrafluoroethylene), or a mixture of a polyethylene and Teflon, is preferable, and preferably it is in the form of a microporous film. Particularly preferable is a microporous film having a pore diameter of 0.01 to 1 $\mu$m and a thickness of 5 to 50 $\mu$m.

The battery may be in the shape of any of a button, a coin, a sheet, a cylinder, a polygon, and the like. The electrodes, rolled together with separators in the form of pellets or sheets, are inserted into a battery can, the can and the electrode are electrically connected, the electrolytic solution is injected, and the can is sealed, to form a battery. At that time, a safety valve can be used as a sealing plate. Further, to secure the safety of the battery, preferably a PTC element (which means a positive temperature coefficient element) is used.

Examples of the material of the bottomed armoring can for a battery that can be used for the present invention include a ferrous plate plated with nickel, a stainless steel plate (e.g. SUS304, SUS304L, SUS304N, SUS316, SUS316L, SUS430, and SUS444), a stainless steel plate (e.g. SUS304, SUS304L, SUS304N, SUS316, SUS316L, SUS430, and SUS444) plated with nickel, aluminum or its alloy, nickel, titanium, and copper, which may take the shape of a round cylinder, an elliptical cylinder, a square cylinder, or a rectangular cylinder. Particularly, when the armoring can also serves as a negative electrode terminal, preferably the material of the armoring can is a stainless steel plate or a nickel-plated ferrous plate, while when the armoring can also serves as a positive electrode terminal, preferably the material of the armoring can is a stainless steel plate, or aluminum or its alloy.

The said sheet-like electrodes with the composition coated may be rolled or folded and are inserted into the can, the sheets and the can are electrically connected, the electrolytic solution is injected, and a battery can is formed by using a sealing plate. At that time, a safety valve can be used as the sealing plate. Besides the safety valve, conventionally known various safety elements may be applied. For example, as an overcurrent preventive element, a fuse, a bimetal, a PTC element, or the like may be used. Besides the safety valve, as a measure against an internal pressure increase in the battery can, a technique wherein a slit is formed in the battery can, a gasket cracking technique, or a sealing plate cracking technique can be used. Further, the battery charger may be equipped with a circuit in which measures against overcharging or overdischarging are built.

The electrolytic solution may be injected all at once, but preferably it is injected in two or more stages. When the electrolytic solution is injected in two or more stages, the composition of the electrolyte may be the same or different each time (for example, after a non-aqueous solvent or a solution of a lithium salt dissolved in a non-aqueous solvent is injected, a non-aqueous solvent having a viscosity higher than that of the former non-aqueous solvent, or a solution of a lithium salt dissolved in a non-aqueous solvent, is injected). Further, for example, to shorten the period for injecting the electrolytic solution, the pressure in the battery can may be reduced (preferably to 500 to 1 torr, and more preferably to 400 to 10 torr), or the battery can may be subjected to a centrifugal force or ultrasonic waves.

For the can and the lead plate, an electrically conductive metal or alloy can be used. For example, such a metal as iron, nickel, titanium, chromium, molybdenum, copper, and aluminum, or their alloys, can be used. As the welding method of the cap, the can, the sheet, and the lead plate, a known method (e.g. DC or AC electric welding, laser welding, or ultrasonic welding) can be used. As the sealer for sealing, a conventionally known compound or a mixture, such as asphalt, can be used.

Examples of the gasket that can be used for the present invention, with respect to its material, include an olefin-series polymer, a fluorine-containing polymer, a cellulose-series polymer, a polyimide, and a polyamide, and in view of the organic-solvent resistance and the low water permeability, an olefin-series polymer is preferable, and particularly a polymer mainly made up of propylene is preferable. A block copolymer of propylene and ethylene is more preferable.

If necessary, the battery of the present invention is covered with an exterior member. Examples of the exterior member include, for example, heat-shrinkable tubing, adhesive tape, metal film, paper, cloth, paint, and a plastic casing. Further, at least part of the exterior member may be provided with a section that will change in color owing to heat, so that the thermal history in use can be seen.

If necessary, the batteries of the present invention, assembled in series and/or in parallel, may be accommodated in a battery pack. The battery pack may be provided with safety elements, such as a positive temperature coefficient resistor, a thermal fuse, a fuse and/or a current breaking element, as well as a safety circuit (a circuit that is for monitoring, for example, the voltage, the temperature, and the electric current of each battery and/or the set of the batteries, and, if necessary, the circuit has a function for breaking the current). Further, the battery pack may be provided with, in addition to the positive electrode terminal and the negative electrode terminal of the set of the batteries, for example, a positive electrode terminal and a negative electrode terminal for each of the batteries, temperature detection terminals for the set of the batteries and for each of the batteries, and a current sensing terminal for the set of the batteries, as outer terminals. Further, the battery pack may have a built-in voltage-converting circuit (e.g. a DC-DC converter). The connection between the batteries may be fixed by welding lead plates, or it may be fixed for easy detachability by using sockets or the like. Further, the battery pack may be provided with a function for displaying, for example, the remaining capacity of the batteries, whether or not charging has been done, and how often the battery pack has been used.

The battery of the present invention can be used in various apparatuses. Particularly preferably the battery of the present invention is used, for example, in video movie cameras, portable video decks having a built-in monitor, movie cameras having a built-in monitor, compact cameras, single-lens reflex cameras, films with a lens, notebook-type personal computers, notebook-type word processors, electronic notebooks, portable telephones, cordless telephones, shavers, electric tools, electric mixers, and automobiles.

By using the compound for use in the present invention, a nonaqueous electrolytic solution secondary battery that has excellent charge and discharge characteristics, and in which the decrease of discharge capacity due to repeated charging/discharging is small, can be obtained.

The present invention is described with reference to the following examples in more detail, but the scope of the invention is not limited to these examples.

EXAMPLES

Example 1

Preparation Example of Positive Electrode Composition Paste

Positive Electrode Active Material: 200 g of $LiCoO_2$ (obtained by placing a mixture of lithium carbonate and tricobalt tetraoxide, in the mole ratio of 3:2, in an alumina crucible, elevating the temperature in the air to 750° C., at a rate of 2° C. per min, to calcine it for 4 hours, then increasing the temperature to 900° C., at a rate of 2° C. per min, to bake it at that temperature for 8 hours, and disintegrating the resulting product; the median particle diameter, 5 μm; the conductivity and the pH of the dispersion obtained by dispersing 50 g of the washed disintegrated product in 100 ml of water, 0.6 mS/m and 10.1, respectively; the specific surface area measured by the nitrogen adsorption method, 0.42 m²/g) and 10 g of acetylene black were mixed in a homogenizer, and then 8 g of an aqueous dispersion (solid content: 50 wt. %), as a binding agent, of a copolymer of 2-ethylhexyl acrylate, acrylic acid, and acrylonitrile and 60 g of a 2 wt. % aqueous carboxymethylcellulose solution were mixed therewith, followed by kneading, and then 50 g of water was added, and the resulting combination was stirred by a homogenizer, to prepare a positive electrode composition paste.

Preparation Example of Negative Electrode Composition Paste

Negative Electrode Active Material: 200 g of $SnGe_{0.1}B_{0.58}Mg_{0.1}K_{0.1}O_{3.35}$ (obtained by dry-mixing 6.7 g of tin monoxide, 10.3 g of tin pyrophosphate, 1.7 g of diboron trioxide, 0.7 g of potassium carbonate, 0.4 g of magnesium oxide, and 1.0 g of magnesium dioxide, placing the mixture in an aluminum crucible, elevating the temperature to 1,000° C., at 15° C./min, under an argon atmosphere, calcining the mixture at 1,100° C. for 12 hours; then decreasing the temperature to room temperature, at 10° C./min, taking the crucible out of the baking furnace, collecting the product, and grinding it with a jet mill; having an average particle diameter of 4.5 μm and a broad peak with the apex near 28° in terms of the 2θ value measured by X-ray diffractometry using a CuKoα beam, with no crystalline diffraction lines observed at 40° or over, but 70° C. or below, in terms of the 2θ value) and 30 g of a conducting agent (artificial graphite) were mixed in a homogenizer, and then, as a binding agent, a mixture of 50 g of a 2 wt. % aqueous carboxymethylcellulose solution with 10 g of polyvinylidene fluoride, which was in turn mixed with 30 g of water, was added, followed by kneading, to prepare a negative electrode composition paste.

Preparation of Positive Electrode and Negative Electrode Sheets

The thus prepared positive electrode composition paste was applied to both surfaces of an aluminum foil current collector of 30 μm thickness with a blade coater, so that the coated amount would be 400 g/m², and so that the thickness of the resulting sheet after being pressed would be 280 μm; and the sheet was dried, compression-molded by a roller press, and cut into a long and narrow positive electrode sheet having a prescribed size. It was dehydrated and dried sufficiently by a far-infrared heater in a dry box (dry air having a dew point of −50° C. or below), to obtain the intended positive electrode sheet (numeral 5 in the figure).

In the similar manner as for the above positive electrode sheet, the negative electrode composition paste was applied to a copper foil current collector having a thickness of 20 μm, to prepare a negative electrode sheet (4) having a coating amount of 70 g/m² and a thickness of the sheet of 90 μm after compression.

Preparation Examples of Electrolytic Solutions

Under an argon atmosphere, 65.3 g of diethyl carbonate was placed in a 200-ml narrow-necked polypropylene vessel, and 22.2 g of ethylene carbonate was dissolved, little by little, thereinto, with care taken so that the liquid temperature would not exceed 30° C. Then, 0.4 g of $LiBF_4$, and then 12.1 g of $LiPF_6$, were dissolved, little by little, thereinto, in the polypropylene vessel, with care taken so that the liquid temperature would not exceed 30° C. The obtained electrolytic solution (6) was a colorless transparent non-aqueous liquid having a specific gravity of 1.135. The water content thereof was 18 ppm (measured by an MKC 210-type Karl Fischer's Water Content Measuring Instrument (trade name; manufactured by Kyoto Denshi Kogyo KK)), and the free acid content was 24 ppm (measured by neutralization titration with a 0.1 N aqueous NaOH solution, using Bromothymol Blue as an indicator). Into this electrolytic solution, each compound for use in the present invention, listed in Table 1, was dissolved, so that a prescribed concentration would be attained, to prepare the electrolytic solution.

Preparation Example of a Cylinder Battery

The positive electrode sheet (5), a microporous polypropylene film separator (3), the negative electrode sheet (4), and a separator (3) were layered, in the stated order, successively and were rolled in a voluted fashion. This roll was accommodated in a bottomed cylindrical battery can (2) made of iron and plated with nickel, in which the can also served as a negative terminal. Then the nonaqueous electrolytic solution (6) containing the additive listed Table 1, as an electrolyte, was injected into the battery can (2). A battery cover (8) with a positive terminal, an anti-explosion valve (7) whose thin section would be broken when internal pressure of the battery was increased, a PTC element (9), an internal lid (10), and a ring (11) for reinforcement, were mounted to the battery can (2) by caulking setting a gasket (1) made of polypropylene between them and the wall of the battery can, to make up a cylindrical battery, as shown in FIG. 1.

According to the above, sample batteries 101 to 115 were prepared.

Comparative Example 1

A cylindrical battery was prepared in the same manner as in Example 1, except that to the electlytic solution the additive was not added.

Comparative Example 2

A negative electrode sheet was prepared in the same manner as the above-described negative electrode sheet, except for using a carbon-series active material (graphite powder) in place of the oxide-series negative-electrode active material, and then a cylinder-type battery was prepared using both the thus-obtained negative electrode sheet and an electrolytic solution free from the additive.

Further, sample batteries 116 and 117 were prepared using an electrolytic solution containing the compound for use in the present invention, as shown in Table 1.

Comparative Examples 3 and 4

Each cylindrical battery was prepared in the same manner as in Example 1, except for using an electrolytic solution in which the amount of the additive to the electrolytic solution was largely changed.

With respect to the batteries prepared in the above manner, charging and discharging were carried out under such conditions that the current density was 5 mA/cm², the charge final voltage was 4.1 V, and the discharge final voltage was 2.8 V, to find the discharging capacity and the cycle life.

The ratio (%) of the initial capacity (Wh) (a ratio of the initial capacity relative to that of the battery in Comparative Example 1) and the cycle property (a ratio of the capacity of the 300th discharge and charge, to the first discharge and charge (%)) of each battery are shown in Table 1. Further, as a shelf life test, the capacity maintenance factor in terms of 4.1 V charge, after the passing of 1 month at 60° C., was measured, for each battery. The results are also shown in Table 1.

TABLE 1

| Sample | Additive | Added concentration mol/l | Ratio of initial capacity | Cycle ratio | Shelf life capacity ratio |
|---|---|---|---|---|---|
| 101 | A-1 | 0.01 | 0.99 | 0.83 | 0.80 |
| 102 | A-23 | 0.01 | 0.99 | 0.82 | 0.80 |
| 103 | B-1 | 0.001 | 0.98 | 0.82 | 0.85 |
| 104 | B-1 | 0.01 | 0.98 | 0.83 | 0.85 |
| 105 | B-1 | 0.1 | 0.97 | 0.83 | 0.84 |
| 106 | B-6 | 0.01 | 0.98 | 0.83 | 0.85 |
| 107 | B-11 | 0.01 | 0.98 | 0.83 | 0.85 |
| 108 | C-14 | 0.01 | 0.99 | 0.82 | 0.82 |
| 109 | C-15 | 0.01 | 0.98 | 0.82 | 0.82 |
| 110 | D-1 | 0.01 | 0.98 | 0.83 | 0.82 |
| 111 | D-4 | 0.01 | 0.97 | 0.82 | 0.81 |

TABLE 1-continued

| Sample | Additive | Added concentration mol/l | Ratio of initial capacity | Cycle ratio | Shelf life capacity ratio |
|---|---|---|---|---|---|
| 112 | E-1 | 0.01 | 0.98 | 0.84 | 0.83 |
| 113 | E-3 | 0.01 | 0.98 | 0.84 | 0.83 |
| 114 | F-8 | 0.01 | 0.98 | 0.84 | 0.83 |
| 115 | G-8 | 0.01 | 0.98 | 0.84 | 0.83 |
| Comparative example 1 | none | 0 | 1.00 | 0.70 | 0.79 |
| Comparative example 2 | none | 0 | 0.80 | 0.76 | 0.79 |
| 116 | B-1 | 0.01 | 0.82 | 0.82 | 0.84 |
| 117 | E-3 | 0.01 | 0.82 | 0.82 | 0.82 |
| Comparative example 3 | B-1 | 0.0001 | 1.00 | 0.71 | 0.79 |
| Comparative example 4 | B-1 | 1.00 | 0.78 | 0.69 | 0.75 |

Example 2

The batteries were prepared in the same manner as in Example 1, except that the additive was added to the positive-electrode active material in place of the electrolytic solution. Consequently, the similar results were obtained.

Example 3

The batteries were prepared in the same manner as in Examples 1 and 2, except that a lithium metallic foil was strip-wise put on the negative-electrode composition, in an amount of 120 mg per g of the negative-electrode material, to establish electrical contact between the foil and the composition, and that the positive-electrode composition was coated, in the coated amount of 240 g/m², on one side of the sheet. Consequently, the similar results were obtained.

It was found that the batteries using the compound for use in the present invention, and also using an oxide for the negative electrode, had greatly improved cycle characteristics.

It was found that the batteries using a carbonaceous material for the negative electrode had improved capacity and cycle characteristics; however, the degree of the improvement was smaller than that of the oxide negative electrode.

Having described our invention as related to the present embodiments, it is our intention that the invention not be limited by any of the details of the description, unless otherwise specified, but rather be construed broadly within its spirit and scope as set out in the accompanying claims.

What we claim is:

1. A nonaqueous-electrolytic solution secondary battery, comprising a positive electrode and a negative electrode, which contain a material capable of reversibly occluding and releasing lithium, a non-aqueous electrolytic solution containing a lithium salt, and a separator, wherein said battery contains a prescribed amount of at least one organoboron compound, wherein said organoboron compound is a compound represented by the following formula (7):

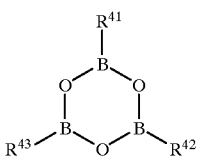

Formula (7)

wherein $R^{41}$, $R^{42}$, and $R^{43}$ each represent a substituted or unsubstituted phenyl group.

2. The nonaqueous-electrolytic solution secondary battery as claimed in claim 1, wherein the said organoboron compound is contained in a nonaqueous electrolytic solution containing a lithium salt.

3. The nonaqueous-electrolytic solution secondary battery as claimed in claim 2, wherein the content of the said at least one organoboron compound contained in the said nonaqueous-electrolytic solution is 0.001 to 10% by weight, to the supporting electrolyte contained in the said electrolytic solution.

4. The nonaqueous-electrolytic solution secondary battery as claimed in claim 3, wherein the said supporting electrolyte at least comprises $LiBF_4$ and/or $LiPF_6$.

5. The nonaqueous-electrolytic solution secondary battery as claimed in claim 1, wherein a solvent of the nonaqueous electrolytic solution comprises at least one cyclic carbonic acid ester, and at least one chain carbonic acid ester.

6. The nonaqueous-electrolytic solution secondary battery as claimed in claim 1, wherein the nonaqueous electrolytic solution contains ethylene carbonate and $LiPF_6$.

7. The nonaqueous-electrolytic solution secondary battery as claimed in claim 1, wherein the said negative electrode comprises a carbonaceous material capable of occluding and releasing lithium.

8. The nonaqueous-electrolytic solution secondary battery as claimed in claim 1, wherein the said negative electrode comprises an negative-electrode material mainly comprising an amorphous chalcogen compound and/or an amorphous oxide, each of which contains not less than three kinds of atoms selected from the 1, 2, 13, 14, and 15 group atoms of the periodic table.

9. The nonaqueous-electrolytic solution secondary battery as claimed in claim 1, wherein $R^{41}$, $R^{42}$, and $R^{43}$ each represents the same or different unsubstituted phenyl group or substituted phenyl group further substituted with at least one substituent selected from the group consisting of a methyl, ethyl, halogenated methyl, methoxy, phenoxy, halogen, cyano, nitro, hydroxyl, acetyl, sulfonylmethane, dimethlamino, methylthio and aldehyde groups.

10. The nonaqueous-electrolytic solution secondary battery as claimed in claim 1, wherein $R^{41}$, $R^{42}$, and $R^{43}$ each represents the same or different unsubstituted phenyl group or substituted phenyl group further substituted with at least one substituent selected from the group consisting of a halogenated methyl, halogen and cyano groups.

11. The nonaqueous-electrolytic solution secondary battery as claimed in claim 1, wherein $R^{41}$, $R^{42}$, and $R^{43}$ each represents the same or different unsubstituted phenyl group or substituted phenyl group further substituted with at least one substituent selected from the group consisting of a fluorinated methyl and fluorine group.

* * * * *